United States Patent [19]

Putman et al.

[11] Patent Number: 4,604,714
[45] Date of Patent: Aug. 5, 1986

[54] STEAM OPTIMIZATION AND COGENERATION SYSTEM AND METHOD

[75] Inventors: Richard E. Putman, Penn Hills; Katherine A. Gundersen, Edgewood; James C. Christenson, Glenshaw, all of Pa.

[73] Assignee: Westinghouse Electric Corp., Pittsburgh, Pa.

[21] Appl. No.: 550,164

[22] Filed: Nov. 8, 1983

[51] Int. Cl.[4] .............................................. H02J 3/00
[52] U.S. Cl. .................................................... 364/494
[58] Field of Search ................. 364/14, 464, 492, 493, 364/494, 174, 176; 60/648, 660, 662; 290/40 R, 40 A, 40 C; 415/15, 17

[56] References Cited

U.S. PATENT DOCUMENTS

| | | | |
|---|---|---|---|
| 3,740,572 | 6/1973 | Cohn | 364/493 |
| 3,878,401 | 4/1975 | Ronnen | 364/494 |
| 4,136,393 | 1/1979 | Fox | 364/492 |
| 4,338,788 | 7/1982 | Fink | 60/648 |

OTHER PUBLICATIONS

"Optimization of Co-Generation", by N. Leffler, pp. 37-40, Tappi, Sep. 1978.
"Energy Management Technology in Pulp Paper and Allied Industries", by A. Kaya et al, pp. 609-622, IFAC, PRP 4, Automation, Ghent, Belgium, 1980.
"Optimal Cogeneration in an Integrated Kraft Mill", by Suh et al, pp. 381-389, IFAC, PRP 4, Automation, Ghent Belgium, 1980.
"Optimierung der Turbinenfahrweise in einem Industriekraftwerk", Trilling et al, Regelungsteehnische Praxis, Jan. 1981.

Primary Examiner—Parshotam S. Lall
Attorney, Agent, or Firm—C. M. Lorin

[57] ABSTRACT

In a multiturbogenerator cogeneration system mass flow balancing is used to optimize the distribution of steam between the machine while meeting the demand in steam and electrical power of the industrial plant in order to choose the less costly between cogenerated power and power purchased from the tie-line. The EVOP method of optimization is used off-line with the assist of a microcomputer to determine the optimal distribution of steam.

3 Claims, 19 Drawing Figures

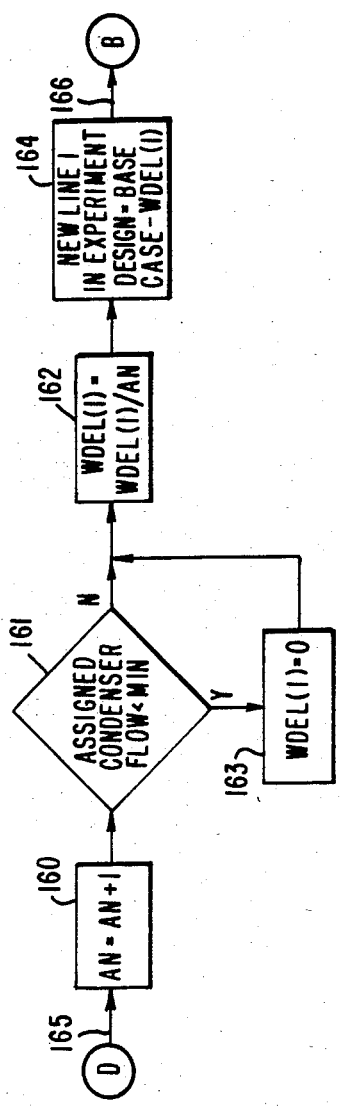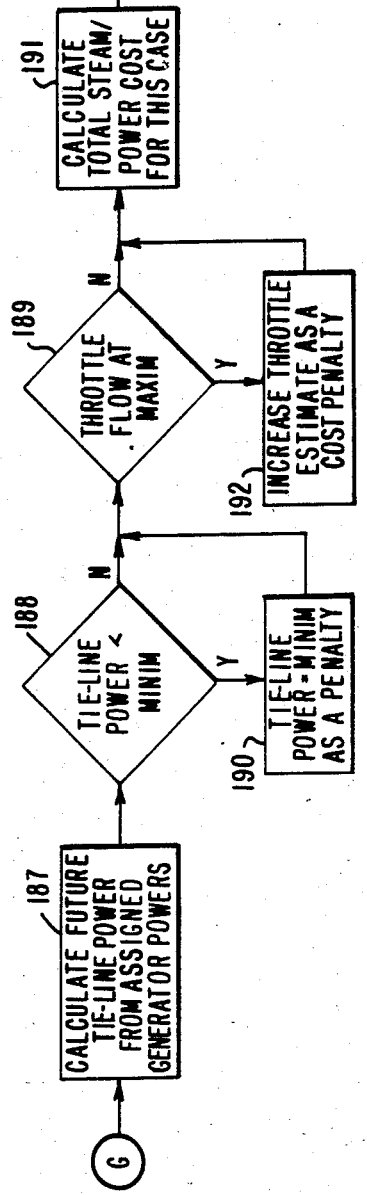

STEAM OPTIMIZATION AND COGENERATION SYSTEM AND METHOD

CROSS-REFERENCE TO RELATED APPLICATIONS

The present application is related to copending filed patent application Ser. No. 548,478, filed Nov. 3, 1983, now U.S. Pat. No. 4,577,280, which is assigned to the same assignee as the present application, and which is entitled "Control System For Fluid Flow Distribution" the disclosure of which is incorporated herein by reference.

BACKGROUND OF THE INVENTION

The present invention relates to process control in general, and more particularly, to a real time computer technique for the optimization and control of a process.

Optimization techniques are known to maximize the production and/or to minimize the cost of operating an industrial process, especially with regard to the consumption of energy and the correlating production output. These techniques are particularly applicable in chemical engineering, and they have been used there for establishing operating conditions that yield a maximum return on investment while minimizing operating costs.

The prior art reveals mathematical optimization techniques, such as linear programming and evolutionary operation techniques. The latter has been paralleled with four other tools used in the past toward such goals. See for instance *Chemical Engineering* of July 5, 1965 "Process Improvement with SIMPLEX Self-Directing Evolutionary Operation" by B. H. Carpenter and H. C. Sweeney, pp. 117-126. These four earlier approaches are: (1) random search; (2) univariate exploration; (3) factorial experimentation; and (4) steepest ascent method.

The EVOP method as originally conceived operates on several key process variables to be given such set points as will yield the best result for the industrial process in terms of production to be maximized, or of costs to be minimized, while taking into account predetermined constraints of such variables. With such process variables to be controlled, a set of initial experiments is run with chosen perturbations thereof and the results in terms of a plant performance criterion, recorded. The poorer result is connected across a line to two other runs having higher results in order to determine the level of a new and intermediary experiment. In this approach, each succession of experiments automatically leads to a region of higher results. This involves calculations conducted on the side with the assistance of a computer, or microprocessor, and the determination of a new run in the succession of runs required involves an elapse of time during which the initial conditions may have been changing. The amount of time required to achieve an optimum varies with the number of set points to be perturbed and there is, therefore, some uncertainty in the expectation of an optimum at the end of such sets of experimental runs if the EVOP technique is used to actually change the set points of the working process control loops.

SUMMARY OF THE INVENTION

It is desirable to be able to quickly establish what the optimum result should be, as soon as a number of initial conditions in the process have been ascertained and especially in response to a new steam demand, or a new power demand, in the plant, or an exercise of demand control in regard to the demand limit assigned to the tie line.

The invention resides in maximizing the utilization of steam, derived from a main stream of steam by a steam-processed installation through at least a first and often a second steam-to-electrical power converter. The main stream of steam is distributed into first and second independently regulated steam flow inputs to the first and second converters, respectively. The first and second steam converters have independently regulated respective first and second steam flow outputs. The first and second converters have respective first and second steam-electrical power response characteristics for providing electrical power in a cogeneration mode in relation to the first and second steam flow inputs and outputs. Means is provided for controlling steam flows in the first and second inputs and outputs to generate electrical power and deliver steam at the first and second flow outputs in accordance with a predetermined power demand and steam demand of the installation. A tie-line network is provided for supplying complementary electrical power for said power demand at a cost different from the power derived from steam by cogeneration. The optimization process is conducted off-line with a model involving balanced mass flow between the first and second steam flow inputs and outputs on the basis of an initial setting. After the optimization assignments have been determined, the first and second steam flow inputs and outputs are given a new setting in accordance with such off-line optimization with the model.

The off-line optimization is performed on the basis of balanced inputs and outputs, thus, without the assist of enthalpy or entropy characteristics in determining the power derived by cogeneration other than as implied in turbo-generator throttle flow equations.

Constraints are exercized and consideration is given to whether inputs and/or outputs are reaching inferior or upper limits during the optimization process, such limits being accepted as a penalty in the model response evaluation.

BRIEF DESCRIPTION OF THE DRAWINGS

FIGS. 5A-5F are flow charts illustrating the optimization control mode of operation of the cogeneration system according to the invention;

DESCRIPTION OF THE PREFERRED EMBODIMENT

Figure 1:
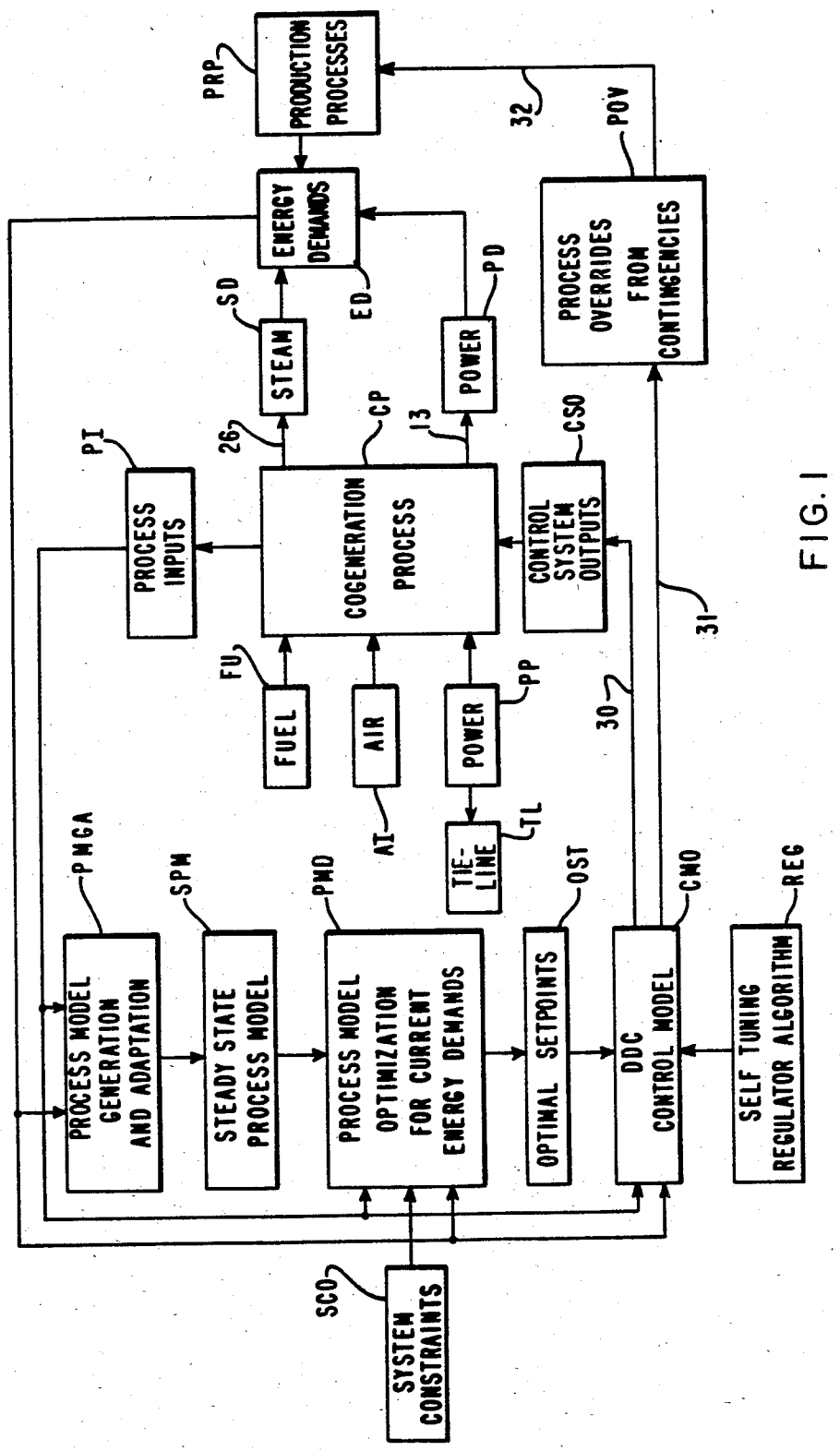
FIG. 1 is a block diagram of a cogeneration process used to generate steam and electrical power to an identical process.

Referring to FIG. 1, a cogeneration process optimization and control scheme is shown in block diagram to illustrate the preferred application of the invention. Production processes PRP require energy demand ED in the form of power PD and steam SD. Power and steam are derived via lines 13 and 26, respectively, from an electrical power and steam cogeneration process CP. Process CP is supplied with fuel (FU) and air (AI) and also with a complement of power (PP) purchased from the tie-line network TL.

A process model computerized system PMD seeks and locates the optimization conditions for the current energy demands along lines 13 and 26 from the cogeneration process. To this effect, system PMD responds: to signals representing the constraints (established by circuit SCO) assigned to the system (power capacity; maximum steam; pressure limits; boiler capacity; throttle flow and valve setting inlet and outlet flow limits; condenser minimum); to signals representing the process model inputs (derived from circuit PI) characterizing the cogeneration process (CP), and the level of energy demand (prescribed by circuit ED) e.g. the total steam and power demand which is required. The process model optimization system PMD establishes optimal set points defined by circuit OST. A DDC control model CMO, optionally updated in accordance with a self-tuning regulator algorithm REG, responds to the set points derived from the optimal set point circuit OST, to the process inputs derived from circuit PI and to the energy demand from circuit ED. The control model unit CMO controls the operation of the cogeneration process CP by causing a control system output circuit CSO to generate command signals, and also controls a circuit POV providing for process overrides in case of contingencies. Moreover, a steady state model SPM is provided, associated with a process model generation and adaptation controller PMGA implementing the optimization method according to the present invention and reflecting the auto/manual status of the units, taking into account whether a unit is ON or OFF-line, acknowledging changing throttle flow coefficients as pressure and/or temperature changes occur.

Figure 2:
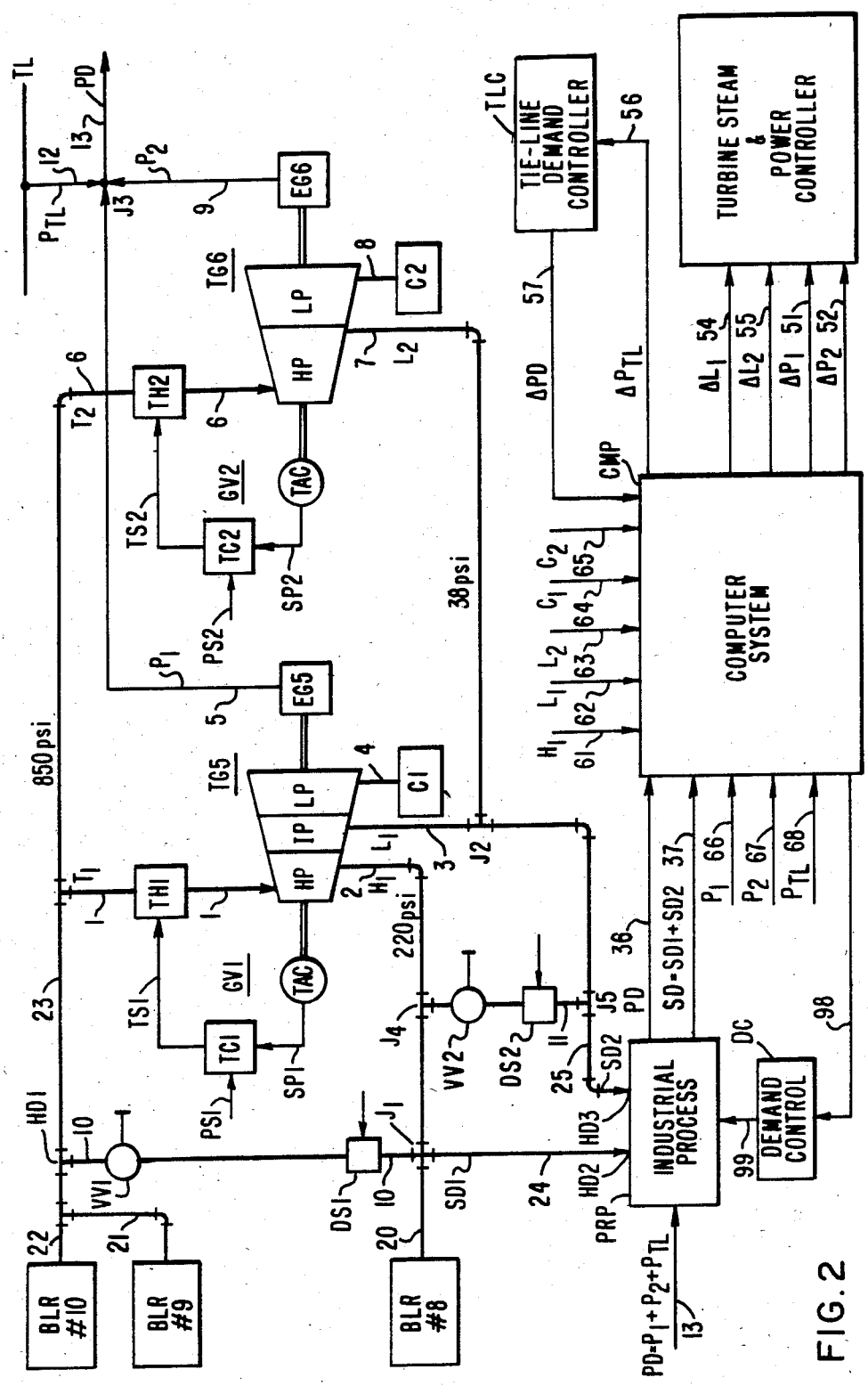
FIG. 2 is a two-turbogenerator group used in the process of FIG. 1 for the purpose of illustration of the preferred embodiment of the invention.

Referring to FIG. 2, the cogeneration process proper typically includes: one low pressure boiler BLR #8 (typically of 210,000 lb/hour steam capacity at 550° F. under 220 psig); one high pressure boiler BLR #9 (typically of 210,000 lb/hour steam capacity at 825° F. under 850 psig); and a second high pressure boiler BLR #10 (typically of 210,000 lb/hour steam capacity at 825° F. under 850 psig).

Boiler BLR #8 supplies to the plant complementary steam at 220 psig and 550° F., via pipes 20 and 24, for the process in accordance with plant requirements for such steam. In addition, the steam demand SD for steam at 38 p.s.i. and 350° F. is supplied to the production processes PRP (lines 3, 7 and 25).

Boilers BLR #9 and BLR #10, by respective lines 21, 22, lead to a header 23 supplying three parallel distribution lines 1, 6 and 10. Line 1 supplies steam to a double extraction condensing turbine TG5. The extractions from turbine TG5 are supplied to the production processes PRP. One extraction by line 2 onto junction J1 connects with lines 20 and 24, namely for steam at 220 psig and 550° F. The other extraction by lines 3 and 25 is steam at 38 psig and 350° F. Line 4 from the lower pressure stage LP of turbine TG5 goes to the condenser C1. Line 6 from header 23 supplies steam at 850 psi to a single extraction turbine TG6. The single extraction is by line 7 to junction J2 between lines 3 and 25, altogether, for steam at 38 psig and 350° F. Thus, lines 24 and 25 carry steam at 220 and 38 psi, respectively, to the industrial process PRP, as required by the steam demand SD. An indication of SD is derived on line 36 from steam demand sensors SD1 and SD2 coupled respectively to lines 24 and 25 which feed the process PRP. Line 8 from turbine TG6 goes to the associated condenser C2. Under steam expansion and correlative loss of enthalpy in turbine TG5 at the speed of rotation, a generator EG5 generates power P1, which is carried by line 5 to a junction mode J3 with line 12 from the tie-line TL of the electrical network. A power demand control sybsystem is associated with line 12. Similarly, a generator EG6 driven by turbine TG6 generates power P2 which is carried by line 9 to the same junction node J3. From junction J3, an amount of power PD flows via line 13 as demanded by the plant. Wattmeters detect P1 on line 5, P2 on line 9 and $P_{TL}$ on line 12. A complement of power $P_{TL}$, as necessary to meet the demand PD, is derived from the tie-line TL by line 12. The required electrical power PD is fed via line 13 to the industrial process PRP.

Complementary steam at 220 psig and 550° F. from line 20 and boiler BLR #8, at junction J1, is added as necessary to the extracted steam from line 2 on turbine TG5. The 38 psi steam of line 3 from turbine TG5 and the one of line 7 from turbine TG6 add their flow beyond junction J2 onto line 25 to the process.

For steam distribution and for regulation purposes, a first bypass valve $VV_1$ having pressure reduction capability from 850 to 220 psi is installed on line 10 between line 23 and junction J1 on line 2, so as to bypass the high pressure stage of turbine TG5. A second bypass valve $VV_2$ having pressure reduction capability from 220 to 38 psi is installed between junction J4 of line 2 and junction J5 of line 25, to bypass turbine TG5 between its two stages H and L. These two valves can help determine how much steam (steam flow H1 measured by a flow meter) is extracted on line 2 and how much steam (steam flow L1 measured by a flow meter) is extracted from turbine TG5 on line 3 and from turbine TG6 on line 7. In addition, there are a throttle TH1 on line 1 to turbine TG5 and a throttle TH2 on line 6 to turbine TG6, both controlled by the associated governor, e.g. in accordance with the speed of the turbines, to regulate the respective admissions of steam from header 23. Throttle flows $T_1$ and $T_2$ are each measured by a flow meter FM. From an overall consideration of the various supplies of steam, shown illustratively in FIG. 2, it is observed that, depending upon plant demand $SD_1$ of steam at 550° F. and 220 psig on line 24, taking account of the boiler capacity (BLR #8, BLR #9 and BLR #10), of turbine consumption via lines 1 and 6, of the extraction at 220 psig from turbine TG5 and line 2, the pressure reducing valve $VV_1$ will be controlled accordingly to maintain header pressure above a low limit.

Similarly, if necessary, pressure reducing valve $VV_2$ is actuated in order to supply complementary steam at 350° F. and 38 psig toward junction $J_5$ so as to satisfy the low limit of pressure for this 38 psi header. It is the object of the method and apparatus according to the present invention to optimize the extraction of steam at 350° F. and 38 psig on either turbine ($EX_1$ on line 3 from TG5, and/or $EX_2$ on line 7 from TG6) and the generation of electrical power ($P_1$ on line 5 from EG5 to TG5 and/or $P_2$ on line 9 from EG6 of TG6 in regard to the cost per unit of steam consumed and the cost per unit of electrical energy purchased, so as to meet the demand SD+PD.

Accordingly, the cogeneration process involves the following variables:

TABLE I

| SYSTEM | VARIABLES |
|---|---|
| 1. Turbogenerator TG5 | Throttle flow (T = T1), on line 1. |
| 2. | 220# extraction flow (H = H1), on line 2. |
| 3. | 38# extraction flow (L = L1), on line 3. |
| 4. | condenser flow (C = C1), on line 4. |
| 5. | power (P = P1), on line 5. |
| 6. Turbogenerator TG6 | Throttle flow (T = T2), on line 6. |
| 7. | 38# extraction flow (L = L2), on line 7. |
| 8. | condenser flow (C = C2), on line 8. |
| 9. | power (P = P2), on line 9. |
| 10. Pressure reducing valve | 850/220# flow (VV1), on line 10. |
| 11. | 220/38# flow (VV2), on line 11. |
| 12. Purchased power | $P_{TL}$, on line 12. |

In addition, a number of constraints are involved in each particular situation. Thus, there is a maximum flow of steam possible through the throttle (TH1, TH2), a maximum power P1, or P2, obtainable from the corresponding electrical generator (EG5, EG6). The following Table II lists the several linear equations involved in the optimization process together with the constraints to be respected for a particular combination of variables.

TABLE II

Figure 3A:
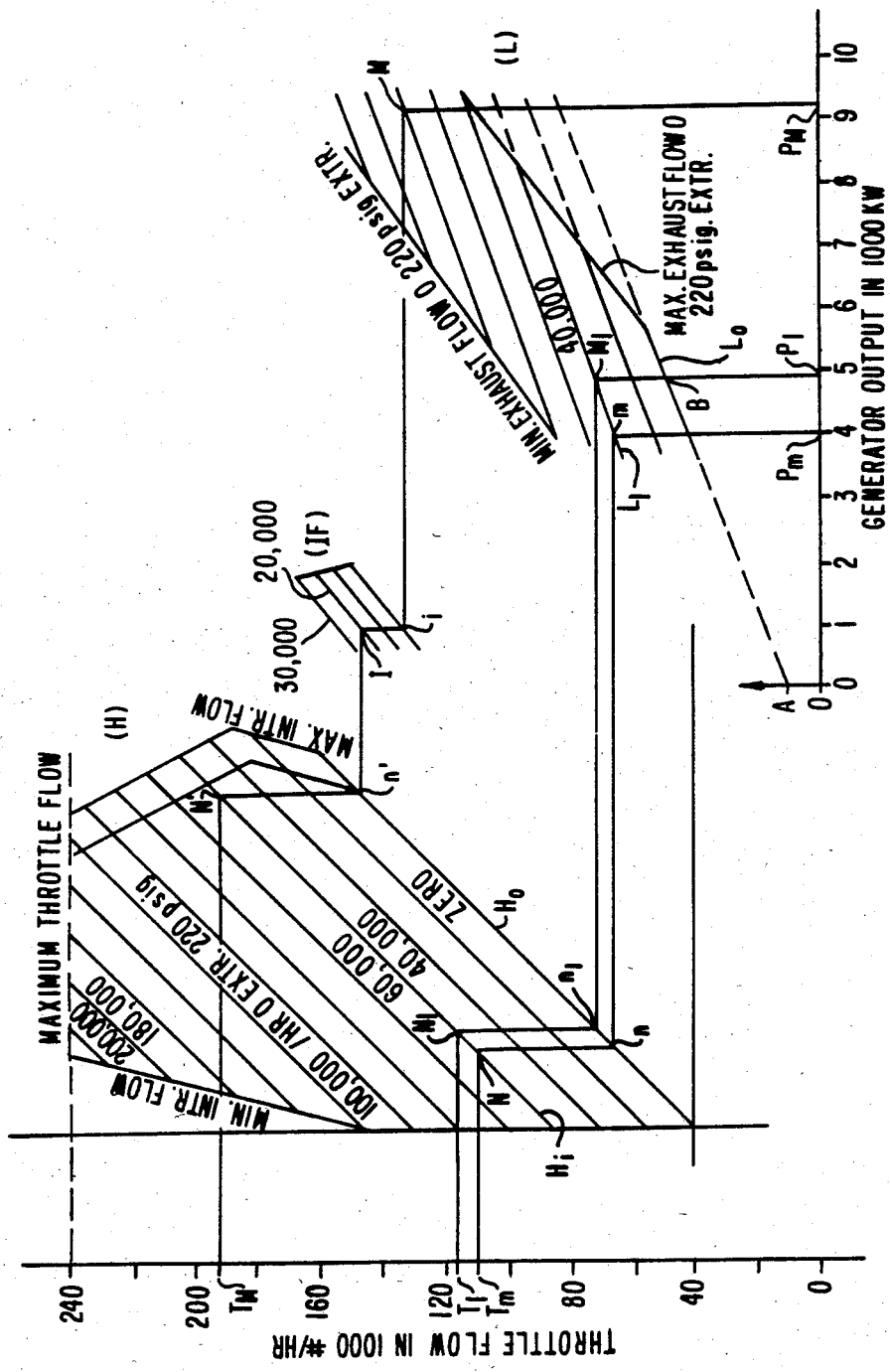
FIGS. 3A and 3B show the steam power characteristics of the two-turbogenerators of FIG. 2, respectively.

| LINE | FUNCTION | DESCRIPTION |
|---|---|---|
| #1 | Turbine TG5 | Maximum throttle flow (for T1, line 1) |
| #2 | | Maximum flow at intermediate pressure (for L1 + C1, lines 3, 4) |
| #3 | | Maximum 38 psi extraction flow (for L1, line 3) |
| #4 | | Maximum power (for P1, line 5) |
| #5 | Turbine TG6 | Maximum throttle flow (for T2, line 6) |
| #6 | | Maximum 38 psi extraction flow (for L2, line 7) |
| #7 | | Maximum Power (for P2, line 9) |
| #8 | Turbine TG5 | Mass flow balance from transform relationship T1 = H1 + L1 + C1 (1) |
| #9 | Turbine TG6 | Mass flow balance from transform relationship T2 = L2 + C2 (2) |
| #10 | Turbine TG5 | Throttle flow equation from the characteristic curves of FIG. 3A: T1 = 12,000 + 0.75 × H1 + 0.5 × L1 + 8 × P1 (3) |
| #11 | Turbine TG6 | Throttle flow equation from the characteristic curves of FIG. 3B: T2 = 12,400 + 0.5 × L2 + 8.57 × P2 (4) |
| #12 | Header HD2 | Mass flow balance to generate net process demand SD1 (line 24) SD1 = H1 + (1.124 · VV1) − VV2 (5) |
| #13 | Header HD3 | Mass flow balance to generate net process demand SD2 (line 25) SD2 = L1 + L2 + 1.085 VV2 (6) |
| #14 | Power Bus | PD = Power Consumption (line 13) where PD = P1 + P2 + $P_{TL}$ (7) |
| #15 | Turbine TG5 | Minimum Power |
| #16 | Turbine TG5 | Minimum Condenser Flow |
| #17 | Turbine TG6 | Minimum Power |
| #18 | Turbine TG6 | Minimum Condenser Flow |

The equations of Table II can be translated by the following Table III into a matrix.

TABLE III

| | TG5 | | | | | TG6 | | | | VV1 850/275 | VV2 220/38 | P KW | |
|---|---|---|---|---|---|---|---|---|---|---|---|---|---|
| | T1 1 | 220 2 | 38 3 | C1 4 | P1 5 | T2 6 | 38 7 | C2 8 | P2 9 | 10 | 11 | 12 | |
| 1 | 1 | | | | | | | | | | | | 240,000 |
| 2 | | | 1 | 1 | | | | | | | | | 140,000 |
| 3 | | | 1 | | | | | | | | | | 150,000 |
| 4 | | | | | 1 | | | | | | | | 9,500 |
| 5 | | | | | | 1 | | | | | | | 135,000 |
| 6 | | | | | | | −1 | | 1 | | | | 130,000 |
| 7 | | | | | | | | | 1 | | | | 9,500 |
| 8 | 1 | −1 | −1 | −1 | | | | | | | | = | 0 |
| 9 | | | | | | 1 | −1 | −1 | | | | = | 0 |
| 10 | 1 | −.75 | −.5 | | −8 | | | | | | | = | 12,000 |
| 11 | | | | | | 1 | −.5 | | −7.2 | | | = | 12,400 |
| 12 | | 1 | | | | | | | | 1.124 | −1 | = | 135,700 |
| 13 | | | 1 | | | | 1 | | | | 1.085 | = | 47,120 |
| 14 | | | | | 1 | | | | 1 | | | 1 = | 12,745 |
| 15 | | | | | 1 | | | | | | | | 4,000 |
| 16 | | | | 1 | | | | | | | | | 10,000 |
| 17 | | | | | | | | | 1 | | | | 3,000 |
| 18 | | | | | | | | 1 | | | | | 10,000 |
| COST | .00672 | | | | | .00672 | | | | .00672 | .0435 | | |

The last line in Table III indicates the costs of steam consumed and of power purchased, while the last column illustratively indicates the magnitudes of the constraints existing in the system.

In Table II, mass flow equation (1) line #8 merely expresses that for turbine TG5 the quantity of steam entering (line 1 of FIG. 2) is equal to the sum of the quantities of steam exiting (lines 2, 3 and 4 of FIG. 2). Similarly, equation (2) (line 9) is the mass flow equation for turbine TG6, translating the fact that the steam entering by line 6 is totally divided between extraction line 7 and condensing line 8 of FIG. 2.

Equation (3) of Table II is a dynamic equation accounting for the expansion of steam coming from the throttle (TH1) as a steam flow T1 through turbine TG5 performing work and generating power (P1) with an extraction of steam (H1, L1) thereafter. Regarding turbine TG5, referring to FIG. 3A, characteristic curves are shown following a linear equation of the general form: $T=a_0+a_1H+a_2L+a_3P$. For zero power ($P=P_1=0$) and zero extraction ($H=H_1=0, L=L_1=0$), the value of $a_o$ may be said to represent the minimum steam admitted through the throttle (TH1) in turbine TG5 in order just to overcome inertia and account for losses. This value is represented by the ordinate of the intersecting point A between line $L_o$ (zero extraction on FIG. 3A) with the vertical ordinate axis (zero power P). $OA=12,000$ lbs/hour in the illustration shown by the curves of FIG. 3A for turbine TG5. For a given operative point M1 in the second stage of the turbine, (curves (L) in FIG. 3A) situated on the L1 characteristic, $a_2L1$ is the vertical translation from B (zero extraction) to M1 (extraction L1). In the example, L1 is equal to 40,000 lbs/hour. In terms of steam flow, the cogenerated power P1 along the power axis is converted from kilowatts into units of steam flow by the coefficient $a_3=8$. For the first stage, the operative point M1 is translated horizontally to the zero extraction point n1 (on $H_o$) in the (H) family of curves. The gain of curves (H) for turbine TG5 are $a_1=0.75$, as stated in line #10 of Table II and in line #10 of the matrix of Table III. The ordinate N1 of point n1 on the 60,00 lbs/hour characteristic defines the throttle flow T1 as 119,000 lbs/hour. Thus, in equation (3), for TG5, $a_3=8$; $a_2=0.5$ and $a_1=0.75$.

Figure 3B:
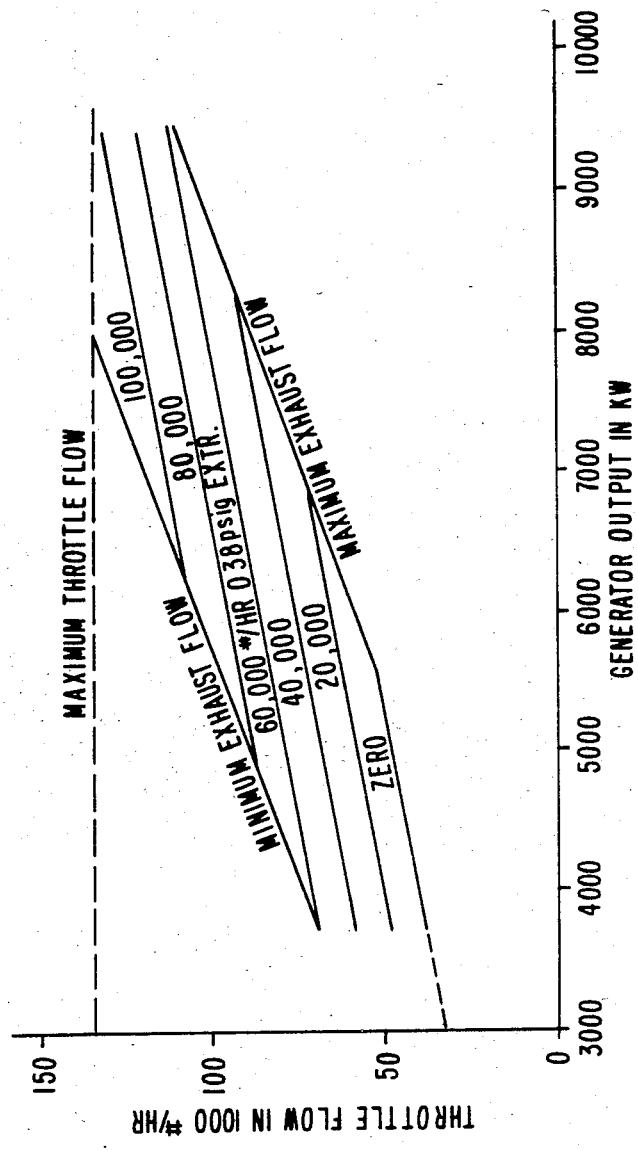

Similarly, FIG. 3B illustrates with one family of curves the dynamic transformation in terms of steam (lbs/hour) from throttle flow T2 under expansion, in the single stage of turbine TG6, to generate electrical power (P2) and supply steam by extraction to the industrial process, in accordance with equation (4) of Table II. Thus, in equation (4) the coefficients are $a_3=7.2$; $a_2=0.5$; and $a_1=0$.

From a comparison of equations (1) and (3) it appears that, relying only upon mass flow, the controlling variables (T1, H1, L1, C1 and P1 for turbine TG5, and similarly T2, L2, C2 and P2 for turbine TG6) are interrelated. Therefore, only a few of the parameters need to be modified when seeking optimization in the distribution of steam in and between turbines and of generated power. Having chosen those few parameters, all the others are determined by simple mathematical calculations. Once the optimization technique has been exercised and a preferred distribution of steam and electrical power has been found for each and between both turbines, the system is adjusted, preferably under the teachings of the afore-mentioned copending patent application. Accordingly, the throttles (TH1 and TH2) are given a set point and the values for the extractions (EX1 and EX2) as well as the condenser flow (C1 and C2) are also adjusted. In other words, advantage is taken of the cost improvement indicated by the optimization process to satisfy the present demand (SD and PD) of the industrial process.

Referring again to FIG. 3A, for the purpose of illustration, it is assumed that P1, the cogenerated power from turbine TG5, cannot be less than 4000 or more than 9200 kilowatts. These constraints determine the total throttle flows for the two operating points M1 on the 40,000 lbs/hour line (L1), and M2 on the assumed maximum extraction flow line of 100,000 lbs/hour (L2). The steam characteristics of turbine TG5 are shown to include an intermediary flow family of curves (IF) ranging from zero to 30,000 lbs/hour through which operative point $M_1$, by i on the zero line and I on the 20,000 lbs/hour line, rejoins a point n' in the (H) family of curves and a point N' on the 60,000 lb/hour line thereof, namely the operative point for the first stage. Accordingly, a maximum throttle flow value TM is defined by the ordinate of N', illustratively 186,000 lbs/hour, the minimum throttle flow value Tm being 119,000 lbs/hour in relation to operative points m, n, N.

The curves of FIGS. 3A and 3B are given by the manufacturer. They have been generally used in the past in order to calculate the flow versus generated power relationships for a turbine. Advantage has been taken of this in the present invention, since by using only mass flow equations and the mass flow versus power relationship no recourse is necessary to any entropy or enthalpy determination when performing the optimization function.

Reference will now be made to the constraints expressed in the last column of the matrix of Table III, in the light of the installation of FIG. 2. Line #1 of Table III expresses that throttle flow T1 for turbine TG5 has a maximum constraint of 240,000 lbs/hour. Limitations due to section flow are expressed in line #2 for the 38 psi extraction of line 3 and for the condenser line 4, e.g. EX1 and C1 can have a limited combined flow of 140,000 lbs/hour. Also the condenser extraction C1 cannot be less than 10,000 lbs/hour as stated in line #15. Line #3 states that power $P_{TL}$ derived from the tie-line cannot exceed 6000 KW, whereas line #4 states that P1, the congenerated power, is less than 9500 KW and more than 4000 KW (line #14). Similarly, for TG6 the constraints are: $T2 \leq 135,000$ lbs/hour; 3000 KW $\leq P2 \leq 9500$ KW and $C_2, \geq 10,000$ lbs/hour. Lines #10 and #11 translate the linear equations (3) and (4), respectively, of Table II, where $T1 \geq 12,000$ lbs/hour and $T2 \geq 12,400$ lbs/hour.

Lines #12 and #13 are related to the pressure reducing valves $VV_1$, $VV_2$ used for pressure reduction by the psi ratios 850/225 (column 10) and 225/38 (column 11). Referring to FIG. 2, pressure reducing valve $VV_1$ converts steam at 850 psi on line 10 to saturated steam at 225 psi by the addition of desuperheating water, passing it down to junction J1. Steam at 225 psi collects from $VV_1$, but also from line 2, e.g. the extraction EX1 from TG5. The total steam from junction J4 goes to junction J1 where it adds up with steam from line 20 directly from boiler BLR #8. At header HD2 the steam consumption by the plant from junction J1 is SD1 on line 24. Pressure reducing valve $VV_2$ converts steam from J4 at 225 psi on line 11 into saturated steam at 38 psi again by the addition of desuperheating water. Junction J5 collects extraction steam at 38 psi from $VV_2$ and from junction J2 common to line 3 of TG5 and line 7 of TG6. The steam at 38 psi is collected at junction J5 and fed by header HD3 to the plant by line 25 as a steam demand SD2. SD1 and SD2 represent the total steam demand SD of the plant PRP. Accordingly, line #12 of Table III expresses SD1 in terms of high pressure extraction flow H1, the flow from pressure reducing valve $VV_1$ and also pressure reducing valve $VV_2$, with a net flow of SD1 equal to 135,700 lbs/hour, thus, at junction J1. The relationship is:

$$SD1 = H1 + 1.124 VV_1 - VV_2 \qquad (5)$$

Similarly, line #13 of Table III states SD2 in terms of the flow from pressure reducing valve $VV_2$ and of 38 psi steam from both TG5 and TG6 for an output at junction J5 of 47,120 lbs/hour. The relationship is:

$$SD2 = L1 + L2 + 1.085 VV_2 \qquad (6)$$

Referring again to FIG. 2, cogenerated power P1 on line 5 from the EG5 generator coupled to turbine TG5 and cogenerated power P2, on line 9 from the EG6 generator coupled to turbine TG6, are added up with complementary power $P_{TL}$ derived from the tie-line TL by line 12, to provide on line 13 a total power PD which is supplied by line 13 to the industrial plant. In this regard, line #14 of Table III expresses that the total power consumed (columns 5, 9 and 12) is equal to 12,745 kilowatts.

The last line of the matrix of Table III indicates the cost of steam (T1, T2) expanded through turbines TG5, TG6 and the steam passed to the pressure reducing valve VV₁, thus bypassing turbine TG5. It also indicates the cost of complementary power $P_{TL}$ purchased from the tie-line TL. These costs are illustratively 0.006727 per unit of steam consumed and 0.0435 per unit of electrical energy purchased.

In this case it is more expensive to cogenerate power P1, or P2, through steam expansion through the turbine, than to purchase it from the tie-line. In another situation it could be the reverse. When evaluating the optimal distribution between steam through turbines TG5 and TG6 and between extraction EX1 (line 2), EX2 (line 7), condenser outputs C1, C2 (lines 4 and 8) and power cogenerated P1, P2 (lines 5 and 9) the conclusion as to what the optimal result is will take into consideration whether power purchased $P_{TL}$ is more, or less costly, than cogenerated power.

The optimization approach which is the object of the present invention consists in applying the aforementioned EVOP method of optimization within the context of the aforestated mass flow treatment of the process variables in a multi-unit turbogenerator steam-power cogeneration process. The EVOP method is, as earlier stated herein, explained in an article by Carpenter & Sweeney in *Chemical Engineering* of July 5, 1965, pp. 117-126. According to the present invention, off-line treatment by the EVOP method is performed with a model based on mass flow balancing in a multiturbogenerator cogeneration installation. Throttle and extraction flow control is, then, effected in accordance with the off-line results. The invention will be explained hereinafter in the context of a two-turbogenerator system, for the purpose of illustration.

Referring again to FIG. 1, the production processes require at a given moment so much steam and so much electrical power (SD and PD). The system according to the present invention is adjusted to control the cogeneration process CP so that, within a very short time, typically the duration of a microprocessing complete calculation with a specially selected algorithm, the optimal proportions of steam flows, to and from TG5 and TG6, and generated as well as purchased power are calculated which will satisfy quantities of steam on line 26 to SD and on line 13 to PD, at minimum cost.

Referring to FIG. 2, within the cogeneration process the allocation of steam and power in accordance with the microprocessing operations and conclusions thereof affects the flows of steam at 220 psi 550° F. (lines 20, 2, 10 and 24) and at 38 psi 350° F. (lines 3, 7, 11 and 25), namely the steam extractions EX1, EX2, for a given steam supply from boiler BLR #8. It also affects the exhaust to the condensers C1, C2. Moreover, the demanded total steam from boilers BLR #9 and BLR #10 which is determined by the throttle flow on lines 1 and 6, is as called for by the governor (GV1 for TG5, GV2 for TG6), the setting of which is fluctuating and controlled in the same process.

Figure 4:
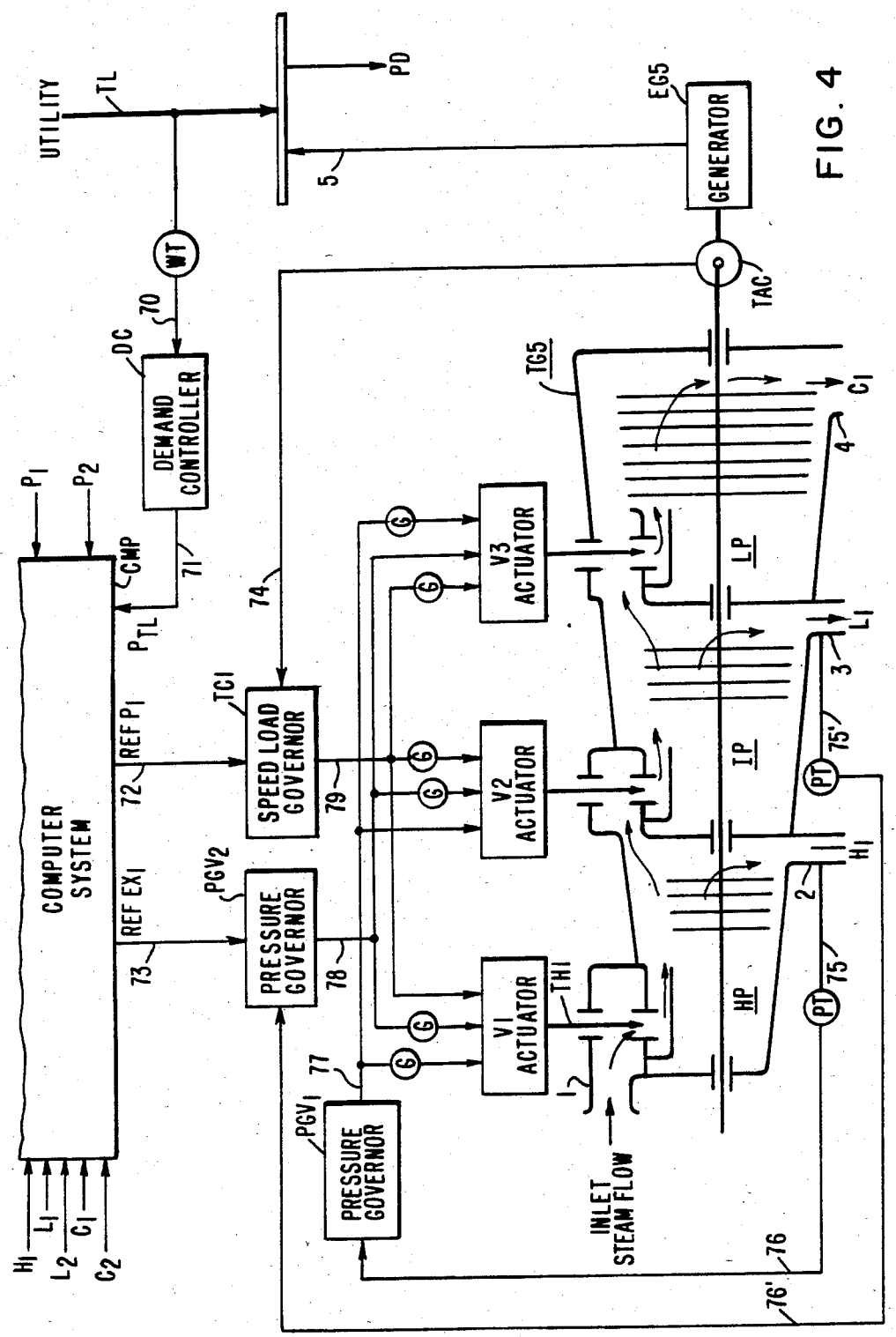
FIG. 4 illustrates interaction between the control system and the speed and pressure governors and valve actuators typically installed on one turbine.

Referring to FIG. 4, for turbine TG5, governor GV1 includes a speed load governor TC1 controlling by line 79 the throttle valve TH1. The turbine control system also includes two pressure governors PGV1, PGV2 responsive to pressure signals respectively derived on lines 76 and 76' from pressure transducers PT. Pressure governor GV1 controls by lines 77 actuators V1, V2 and V3 of the high, intermediate and low pressure sections, respectively. Pressure governor GV2 controls the same by lines 78. It is observed that the gain G between a given governor and a given actuator can be less than unity when the signal is provided for the purpose of internal decoupling. Similarly, turbine TG6 is provided with a speed load governor, or throttle controller TC2 and a pressure governor PGV3 (not shown), within the governor GV2, under respective control setting signals for the speed and for the pressure. A change of extraction ΔEX1 on line 3 and a change of power ΔP1 from generator EG5 are imparted by the computer system CMP, after optimization by imposing a reference setting EX1 through line 73 for PGV2 and a reference setting PS1 through line 72 to TC1 for TG5 in FIG. 4. Similarly, CMP controls TG6 to prescribe a new value of EX2 by a reference setting upon PGV3 (not shown) and/or P2 by a reference setting PS2 to TC2 for TG6. The allocation of steam determines the distribution of generated powers P1, P2 between turbines TG5 and TG6 in accordance with the microprocessing operation. Finally, in the optimization evaluation by the computer system CMP, the optimal complement of power $P_{TL}$ to be derived on line 12 from the tie-line network is also ascertained, such amount of energy purchased from the network depending, in the optimization process, upon whether it is cheaper, or more expensive, to generate power (P1+P2) locally, or to purchase some power $P_{TL}$ from the network.

The operation of the system according to the invention will now be described by reference to the flow charts of FIGS. 5A-5F, to the matrix of equations stated in Table III, and to the EVOP model for optimization with microprocessing techniques represented by Table IV hereinafter.

At the start (FIG. 5A), it is ascertained whether there is power generated or not, namely by turbogenerators TG5, TG6. This is a test whether the turbine circuits are set in motion beyond the minimum power level, or whether they have been shut down. This is ascertained at 100. The initial condition, if there is no power, is established at 101 (COND(I)=0). The system then goes to 103 where the throttle flow of each turbogenerator unit (TG5, TG6) is determined using the throttle flow equation of Table III (equation (3) for TG5, equation (4) for TG6). To this effect, powers P1, P2 are sensed with a wattmeter on lines 5 and 9, respectively. The steam extractions (H1, L1) of lines 2 and 3, respectively, for TG5 and (L2) of line 3 for TG6, are sensed by flowmeters mounted on those lines (FIG. 2). Considering equation (3) for the purpose of illustration, which contains at zero output a minimum throttle flow of 12,000 lbs/hr, the values measured are set into the equation as follows:

$$T1 = 0.75 H1 + 0.5 L1 + 8 P1 + 12,000 \qquad (3)$$

thereby to derive the throttle flow value T1. The same is done with equation (4) of Table III to derive the value of throttle flow T2 for the TG6 unit.

$$T2 = 0.05L2 + 7.2 \times P2 + 12,400 \qquad (4)$$

The system then goes to 104, where the mass flow balance, expressed by equations (1) and (2), leads to the determination of the condenser steam C1 and C2, since:

$$T1 = H1 + L1 + C1 \text{ and } T2 = L2 + C2 \qquad (2)$$

These calculations are also effected in accordance with the flow chart of FIG. 5E, as explained hereinafter.

At this stage all parameters P1, T1, H1, L1, C1, P2, T2, L2 and C2 are known. These will be used in applying the EVOP technique with the model of Table IV for optimization as explained hereinafter.

It is observed, at this time, that the model approach is being based on disturbances exercised on the system under the guidance of a planned succession of tests. It is important here to consider how steam flow distribution and power are brought to converge toward an optimal interrelationship.

Once an optimal relationship has been established (at 185, FIG. 5C), control is effected (via line 186, FIG. 5C) as explained hereinafter and in the afore-mentioned copending patent application, in which it is shown how steam flows are effectively and automatically distributed between the two turbogenerator units in order to meet the assigned pressure settings.

Referring to FIG. 2, the industrial process PRP, at a given moment, receives via line 13 electrical power $Pd = P1 + P2 + P_{TL}$, where $P_{TL}$ is the amount purchased from the utility company (tie-line TL). It also receives steam $SD = SD1 + SD2$ from headers HD2, HD3 and lines 24 and 25. The steam consumed may be on line 24, steam at 220 psi resulting from the upper stage (HP on line 2) of TG5, or steam bypssed through pressure reducing valve $VV_1$ from the 850 psi header HD1 (line 21 from boiler BLR #9 through line 24, junction J1 and line 10. The steam of line 24 may also come directly as a complement from line 20 and boiler BLR #8. On the other hand, the steam of line 25 is steam at 38 psi provided either from the L1 extraction section LP of TG5 (line 3) and the L2 extraction of section LP in TG6 (line 7), or it may result from by-passed steam through pressure reducing valve $VV_2$ from line 2 and junction J4.

The process demand is the sum of the power demand $PD = P_1 + P_2 + P_{TL}$ and the steam demand $SD = SD1 + SD2$. A computer is provided with input signals representing PD (line 38), SD (line 37), H1 (line 61), L1 (line 62), L2 (line 63), exhaust C1 from the condenser of TG5 (line 64), exhaust C2 from the condenser of TG6 (line 65), (line 66), P2 (line 67) and $P_{TL}$ (line 68). As a result of computations explained hereinafter, the control process is conducted with command signals KΔP1 (line 51), ΔP2 (line 52), ΔH1 (line 54), and ΔL2 (line 55), to the turbine, and $ΔP_{TL}$ (line 56) to the tie-line. These control signals derived, in accordance with the present invention, superimpose on the overall management process control of the industrial plant a refining optimization control or adjustment process control, also effected according to the present invention.

The command signal ΔP1 of line 51 goes to the speed setting input of throttle controller TC1 which, in response to a tachometer TC associated thereto in relation to the turbine TG5 and generator EG5, regulates the throttle TH1 in the steam pipe 1 to the high power stage H of the turbine. As a result, the generated power P1 of EG5 on line 5 is in fact regulated by signal ΔP1, so as to achieve generator speed according to the speed setting. In the same manner, signal ΔP2 of line 52 goes to throttle controller TC2 of turbine TG6 and contributes to adjusting the opening of throttle TH2 of steam pipe 6, thereby to modify P2 on line 9 from generator EG6. The extraction $EX1 = L1$ of turbine TG5 is modified by command signal ΔL1 of line 54, while the extraction $EX2 = L2$ is modified on turbine TG6 by command signal ΔL2 of line 55.

Typically, generators EG5, EG6 are AC synchronous machines, so that a change of speed setting entails a change in power. The governors (GV1, GV2) are part of pressure and speed control loops including the throttle controller (TC1, TC2) and the throttle valve (TH1, TH2).

FIG. 4 schematically shows conventional speed and pressure governors and valve actuators installed, for illustration, on turbine TG5. Actuator V1 controls the pressure of the steam in the high pressure section HP of the turbine by controlling throttle TH1 admitting more or less steam from steam line 1 in response to control line 79 from speed governor TC1. Similarly, actuator V2 controls the intermediate flow into the low pressure section LP of the turbine. Pressure sensed via line 75 and pressure transducer PT at the extraction outlet 2 is used by line 76 to establish through pressure governor PGV1 the desired constant 220 psi steam pressure in extraction line 2. Also similarly, actuator V3 controls the admission of steam from the LP section into the condenser section in response to control line 28 from pressure governor PGV2. Pressure, sensed via line 25' and pressure transducer PT at the low pressure outlet 3, is used by line 76' to establish through pressure governor PGV2 the desired constant 38 psi steam pressure in extraction line 3. In addition, pressure governor PGV2 is modified by a setting change ΔEX1 prescribed on line 73 by the computer system CMP as a result of optimization; whereby actuator V3 establishes a steam flow value $L1 = EX1$ at the extraction line 3 and a condenser exhaust flow C1 from line 4. In the same fashion, tachometer TAC by line 74 establishes a power setting P1 onto the speed load governor TC1 which is itself affected by a setting change imposed from line 72 by the computer system CMP as a result of optimization.

Parallel lines from lines 77, 78 and 79 to the two actuators, other than the one controlled as hereabove stated, differ by the provision of gains G less than unity on each such additional lines, in accordance with generally known turbine control practice.

FIG. 4 has been described illustratively for turbine TG5 of FIG. 2. Pressure governor and speed governor are readily conceived in similar terms for establishing a steam extraction EX2 in response to a change ΔEX2 imparted from the computer system and cogenerated power P2 in response to a change ΔP2 imparted from the computer system in the case of turbine TG6 of FIG. 2. A demand control loop is installed, showed illustratively on FIG. 4, extending from the tie-line of the utility company via the associated wattmeter, line 70, demand controller DC and line 71 to the computer system CMP. The demand controller is according to the teachings of U.S. Pat. No. 3,872,286. There is also a decoupling control loop which operates as explained hereinafter, and also as given with more details in the afore-mentioned copending patent application. The hydraulic control, by playing on the extractions (EX1, EX2) in accordance with the pressure set points maintaining a given pressure, determines the amount of condenser exhaust (C1, C2). The hydraulic loop maintains the pressure by adjusting the condenser exhaust, throttle flows and speed. When control is exercised either under demand control changing the electrical load distribution in the plant, or under optimization control, or both, the change in the amount of power (P1, P2) cogenerated and tie-line power $P_{TL}$ drawn is determined by the change of steam flow distribution between the two units and through the decoupling algorithm, described in the copending patent application, when adjusting the pressure settings.

For a total steam flow $T=T1+T2$ in header HD1 to units TG5 and TG6, the total steam flow T is equal to the sum of the extractions and condenser flows $T=H1+EX1+EX2+C1+C2$. Should one of the extractions be fixed, for instance EX1, the other extraction EX2 is equal to $T-EX1-C1-C2$. A change of power P2 will be effected by adjusting EX2. If the extractions are fixed, adjustment may take place on C1 and C2, e.g. on the condensers, and if C1 is fixed, adjustment will be only on C2 assuming it lies above its low limit. Thus, considering control actin on TG6, increasing C2 will increase P2, whereas decreasing EX2 will cause an increase of the power P2 according to generally known turbine flow principles.

More generally, the hydraulic loop will control and maintain the pressure in accordance with condenser exhaust, throttle steam flow and turbine speed, while the EVOP technique according to the invention will adjust the control settings in accordance with the optimum solution found, establishing the relationship between extractions EX1, EX2, the throttle steam flows (T1, T2), the condenser flows (C1, C2), and leading to cogenerated powers P1, P2 and tie-line power $P_{TL}$.

Control is effective with a turbine generator unit on automatic (AUTO). Therefore, it is necessary to ascertain whether one turbine, or the other, or both, are on AUTO before practicing the optimization process according to the invention.

From a general consideration of FIG. 4 which relates to turbine TG5, and of a governor control system similarly applicable to turbine TG6, it appears that with the turbine set on MANUAL, the operator in the plant will establish the settings for the pressure governor corresponding to a chosen and stable operative mode considering actual demand in steam and/or power. Then, the turbines are set on AUTO, whereby the computer system CMP will calculate an optimum setting and/or a demand control setting which entails changes, on lines, 72, 73 of turbine TG5, for instance. The setting changes required to obtain the calculated optimum, or to meet demand control requirements are effected with contactors moved by small motors rotating in either direction (according to the sign of the error from the present setting) during a lapse of time which represents the magnitude of the change (or error to be nullified) to be performed. Thus, the signals outputted by the computer system CMP which, on lines 72 and 73 of FIG. 4 for instance, represent the optimization results, are converted into time lapses of motor operation with the contactors.

Figure 4A:
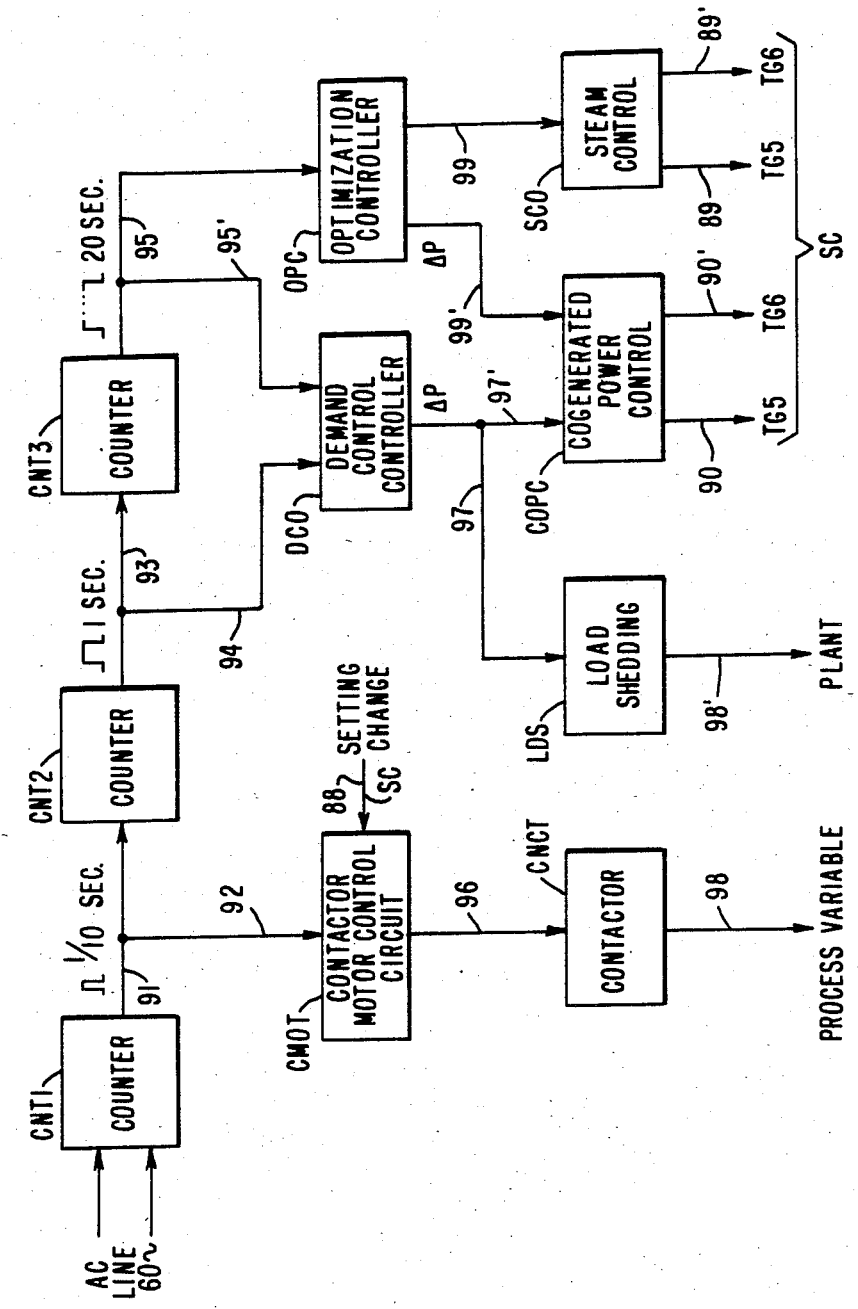
FIG. 4A illustrates a gating system for the several programs and functions of the computer system controlling a hydraulic controlled turbogenerator system as shown in FIG. 4.

Referring to FIG. 4A, the 60 period AC line is coupled to a counter CNT1 synchronized with the zero-crossings. The output of counter CNT1 establishes a 1/10 of a second time interval (typically) defining the resolution of contact closure under the contact closure control program (see CCOCON in the Appendix). FIG. 4A shows by lines 91 and 92 control of the contactor motor control circuit CMOT having a setting change SC imposed by line 88 for the particular process variable (for instance cogenerated power P1 on line 72 of FIG. 4, or the extraction EX1 required on line 73 thereof for the steam on TG5). Circuit CMOT translates on line 96 the control into motion for the contactor CNCT for the same process variable (via line 98).

Line 91 is inputted into a second counter CNT2, the output of which on line 93 defines a time interval occurring every one second (typically). This time interval is used on line 94 for the demand control period count within demand controller DCO (see the demand control section in the Appendix). Therefore every second the time into the demand control period is updated. As a result, at the end of the demand period (typically 15 minutes) the assigned demand limit will be achieved by the demand controller following a first period (4 minutes as stated in the Appendix) of No Control, followed by a Deadband Control period (5 minutes), and finally with a last period of Adjustable Bias and No Deadband Control (last 5 minutes). Control may be by 97 to have load shedding (LDS) and action in the plant by 98' or by 97' to increase the cogenerated power through circuit COPC to compensate for power reduction (for instance on the tie line, $P_{TL}$) and maintain the demand PD. Cogenerated power reduction may be by 90 on TG5 or by 90' on TG6. These actions are causing corresponding setting changes SC for the process variables (P1 or P2).

The time interval of line 93 is triggering a third counter CNT3 which establishes on its output line 95 a third time interval of 20 seconds (typically). This is the recurrence of optimization by the optimization controller OPC (see the turbine and extraction valve section in the Appendix) and of exercizing of the demand control algorithm, namely by line 95' to DCO. Accordingly, via 99 on the output of OPC steam control is effected (circuit (SCO) to provide on line 89 for TG5 an extraction flow EX1, or on line 89' for TG6 an extraction flow EX2, or via line 99' a change of cogenerated power may be required affecting circuit COPC also translated into ΔP1 for TG5 on line 90, or ΔP2 for TG6 on line 90'.

Figure 5A:
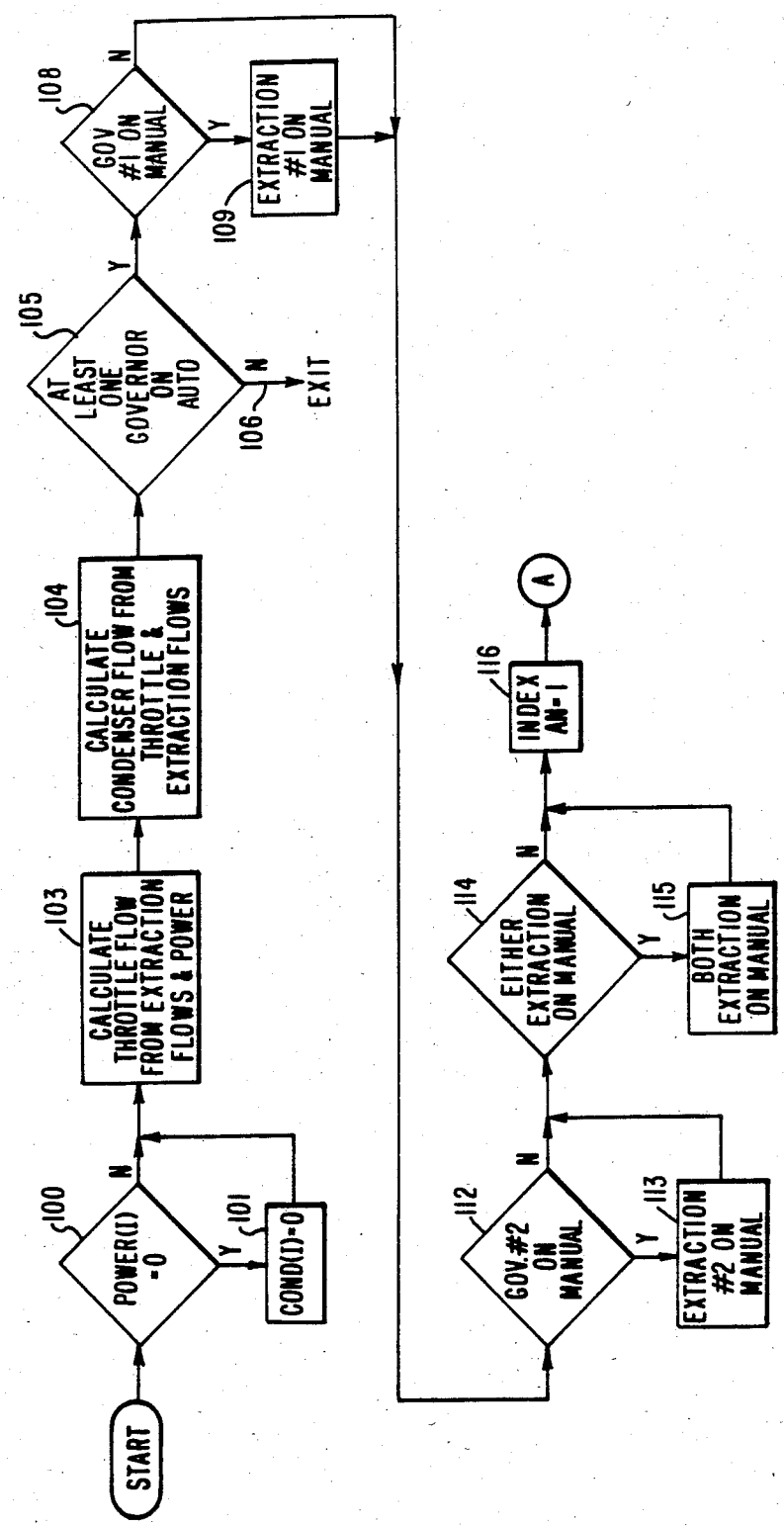

Considering again the optimization process, control is effected at steps 105, 108, 109 and 112–114 of the flow chart of FIG. 5A. If to the question whether only one governor is on AUTO, at 105, the answer is no, the circuit exits by 106, because when both governors are on Manual (MAN), nothing can be done to optimize. If only one is on Manual (MAN), for instance on turbine TG5 at 108 (it is on turbine TG6 at 112), then the extraction $EX1=H1+L1$ is set on Manual at 109. The reason is that since TG5 is on Manual, control of the steam distribution has to be exercised on EX2 and/or C2 of the other turbine TG6. It is necessary to fix EX1 at a given flow amount. This is done at 109. If the Manual status is on turbine TG6, the reverse situation is indicated by steps 112 and 113. Step 114 raises the question whether, after stages 108 and 112, either extraction has been set on Manual. If it is Yes, they are both placed on Manual and one is adjusted against the other, manually. After this has been done, the system records the initial index $AN=1$ which initiates the first step of an accumulated number of optimizing steps carried out with a given set of perturbances effected on the EVOP model during optimization, specifically five steps shown at 130 before proceeding with control.

Figure 5B:
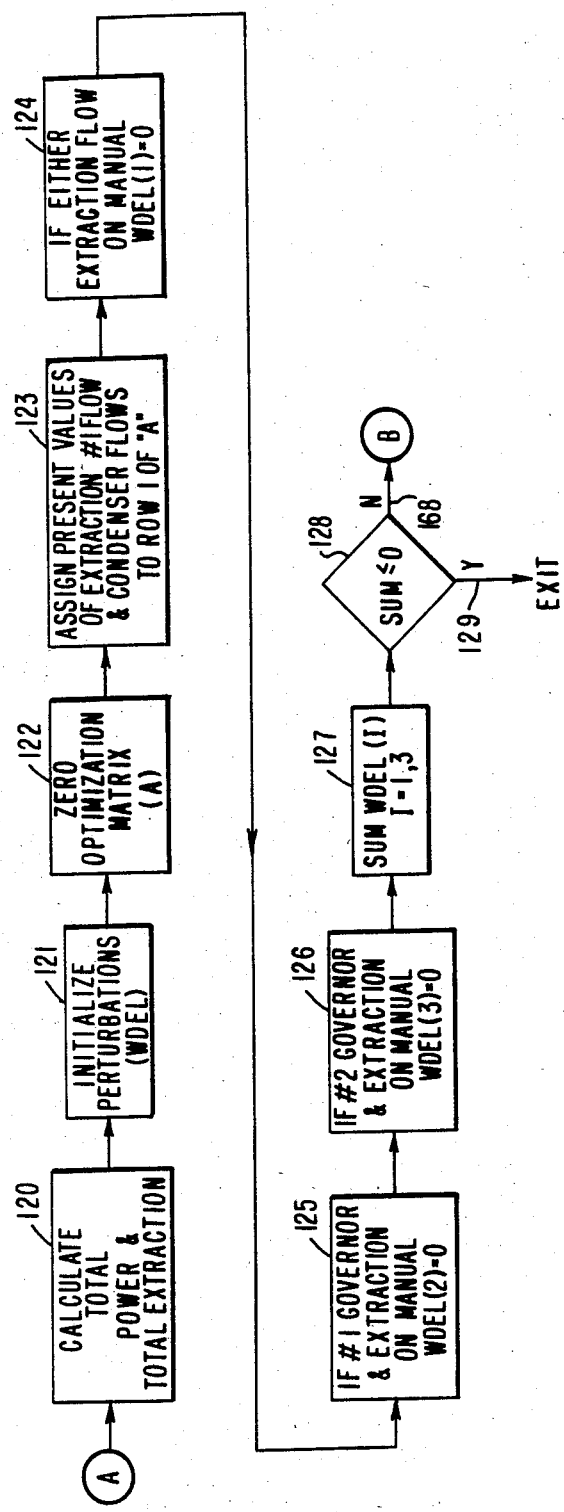

Referring to FIG. 5B, at 120 the total power P and the total extraction are determined on the basis of the inputs of lines 67, 68, 69 for power and of lines 61, 62, 63 for the extractions into the computer system. Line wattmeters and flowmeters are providing this information. In this regard, it is recalled that (at 103) EX1 and EX2 have been determined and that (at 120) the calculation is the sums $P=P1+P2+PTL$ and $EX1+EX2=EX$. In the latter regard, when necessary, steam flow derivation by pressure reducing valve VV$_2$ will be taken into account in keeping with column 10 of the matrix of Table III.

At this point reference must be had to the following base model for EVOP optimization of Table IV.

TABLE IV

| TEST | #1 EXTRACTION FLOW EX1 | #1 CONDENSER FLOW C1 | #2 CONDENSER FLOW C2 | COST |
|---|---|---|---|---|
| BASE | BASE$_1$ | BASE$_2$ | BASE$_3$ | — |
| 1 | BASE$_1$ − a$_1$ | BASE$_2$ − a$_2$ | BASE$_3$ − a$_3$ | COST$_1$ |
| 2 | BASE$_1$ + a$_1$ | BASE$_2$ − a$_2$ | BASE$_3$ − a$_3$ | COST$_2$ |
| 3 | BASE$_1$ | BASE$_2$ + 2a$_2$ | BASE$_3$ − a$_3$ | COST$_3$ |
| 4 | BASE$_1$ | BASE$_2$ | BASE$_3$ + 3a$_3$ | COST$_4$ |

This table is illustrative only. In the example, it applies to two turbogenerators like shown by FIG. 2 in the preferred embodiment of the invention. The table includes three columns for EX1, C1 and C2, respectively. With regard to EX2, it is observed that if the variables selected for introducing a perturbation are the EX #1 flow, the C #1 condenser flow, and the C #2 condenser flow, e.g., if the EX #1 extraction flow and the total EX extraction flow used by the process as steam are known, the extraction flow EX2 from TG6 is known by difference. On the other hand, if the extraction and condenser flows are known, these are used to calculate the throttle flows T1, T2. Finally, from the known throttle flows and extraction flows, the generated power is calculated.

Tie-line power is the total power PD minus the sum of the cogenerated powers P1 and P2. What is the hourly cost established for each line of the experimental design can then be calculated from the sum of throttle flows multiplied by steam cost, plus tie-line power multiplied by purchased energy cost, and is illustratively stated in the last line of Table III.

In the article entitled "Process Improvement with SIMPLEX Self-Directing Evolutionary Operation" by B. H. Carpenter and H. C. Sweeney in *Chemical Engineering* of July 5, 1965, is described the EVOP method of optimization. This method is based on a matrix of several process variables disturbed by predetermined increments successively in accordance with a series of tests revealing an improved situation, after which, based on the best results attained, a new set of values for the process variables is in turn disturbed, and this is repeated until the results converge on an optimum. These tests have, in the past, been carried-out On-line by perturbing the process. In contrast, in accordance with the present invention, advantage is taken of the fact that the process variables are, as earlier stated, all equated to steam flow from a common steam generating source, including the electrical power which is converted from a related steam flow amount. Mass flow balancing permits an immediate translation of any change in one of the process variables, or more than one, into a change in cost. Therefore, the evolution on the model so incorporated can immediately be evaluated by simulation, thus, without an actual control action yet occurring. The simulation process is pursued until an established optimum steam and power distribution is arrived at. At this stage it becomes available to be reflected back into the system, e.g., by adjusting control loop set points in real time. Control of the turbogenerators and of the associated pressure reducing valves is performed accordingly. At a result, what would otherwise take too much time to hold the assumed conditions in the matrix unchanged can now be effected on a reliable set of facts with the base model in the matrix, taking advantage of the high speed of operation inherent in a microprocessor, for instance.

Referring to Table IV (which is the matrix of the model illustrated for performing the EVOP method according to the present invention), typically four tests are required for each iteration, namely, rows 1-4 following the "base case" (EX1, C2, C2) which is tested at every step (AN) for which a new set of perturbations a$_1$, a$_2$, a$_3$ are being put to test.

Referring to FIG. 5B of the flow chart, at 120 the total power and total extraction drawn by the industrial process are calculated on the basis of the steam flows provided by flowmeters (FM) and the power measured by wattmeters (WM), and with the assist of the calculations made initially at step 103 of the flow chart (FIG. 5A). As a result, there is so much steam SD and so much power PD to be consumed by the industrial process. The system and method according to the present invention are going to ascertain how the steam should be distributed between the two turbines TG5, TG6, in the example, how much generated power is to be distributed between line 5 (P1) and line 6 (P2) and how much power should be purchased (P$_{TL}$) from the utility company (line 12 and tie-line TL). It is recalled that at the start of the first iteration in the major or outer loop at 116 (FIG. 5A) $AN=1$. Then, at 121 in the array WDEL, the deltas, or perturbations, are chosen to be a$_1$, a$_2$, a$_3$ for columns 1, 2, 3 in the matrix of the model (Table IV). At 122 the matrix is zeroed, by erasing all previous data. At 123 the present values of EX1, C1 and C2 known from steps 103 and 104 are assigned to the first row of the matrix and the chosen perturbances applied. Therefore, column 1, line 1 becomes (EX1-a$_1$); column 2, line 1 becomes (C1-a$_2$) and column 3, line 1 becomes (C2-a$_3$) in the matrix. It is necessary at 124, 125 and 126 to reflect into the model the status of the condensers as ascertained at (108, 109), (112, 113) and (114, 115) in FIG. 5A, when carrying EX1, C1 and C2 into the respective claims thereof. Thus, if at 124 either extraction EX1, EX2 is on Manual, then, for column 1 perturbation a$_1$ must be zero, or $WDEL(1)=0$. Likewise at 109, if turbine TG5 has the extraction on Manual, at 125 $WDEL(2)=0$, e.g., there cannot be any perturbation a$_2$ introduced in column 2. In the same way, $WDEL(3)=0$ and $a_3=0$ if 113 indicates for TG6 that EX2 is on Manual. This is reflected by step 126. Should all states 124, 125, 126 have a zero status, no control is possible. Then at 128 by 129 the system exits. No optimization is possible.

Figure 5C:
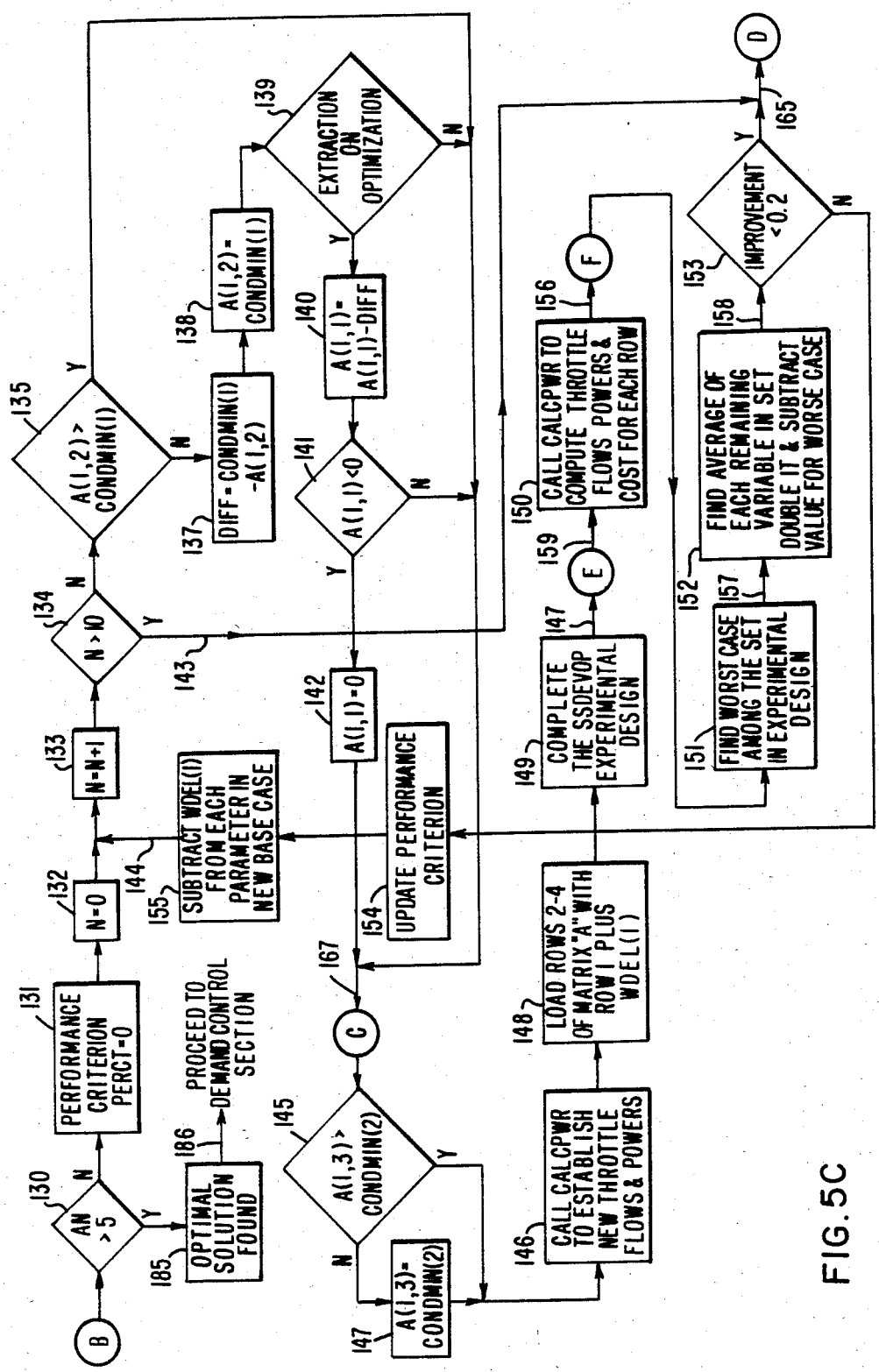
Figure 5E:
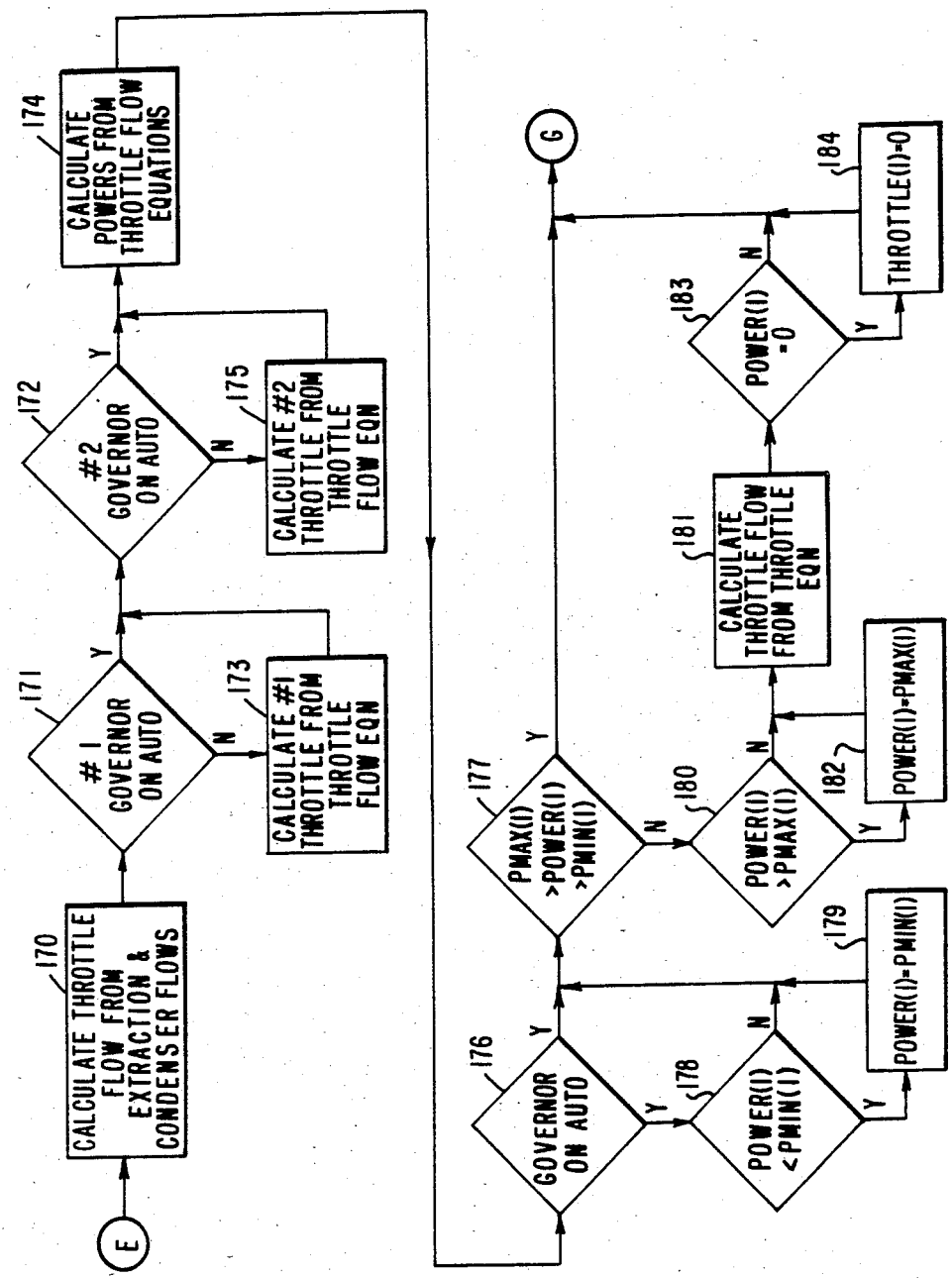

Otherwise, by 168 the system prepares itself for successive iterations with the inner loop at B in FIG. 5C. It is assumed that initialization with a set of values for a$_1$, a$_2$, a$_3$ at 121 has not been repeated more than five times, as ascertained at 160 (FIG. 5D). If it has, the major, or outer, iteration loop is no longer exercised and the optimal solution at 13 and 185 is considered to have been found. Therefore, by 186 the optimization process is terminated and the system goes to demand control where the demand control requirements are combined with the optimal distribution requirements. Combined control requirements are converted into set points such as applied for TG5 by lines 72, 73 to the speed load governor TC1 and pressure governor PGV2 (FIG. 4), in accordance with the teachings of copending patent application Ser. No. 548,478. There may also be a testing of the optimal solution against demand control requirements as explained hereinafter by reference to FIG. 5G and as illustrated by the listing in Appendix.

Otherwise, until the number 5 has been reached at 130, the system will proceed with the inner loop iteration process with decreasing values of perturbations $a_1$, $a_2$, $a_3$ for the current delta interval AN, up to ten times as indicated at step 134. Initially, the performance criterion (or cost figure) is zeroed ($PERCRT=0$). The value of N is made zero at 132, so that the inner loop can be started. At 133 the number of iterations are initiated and counted ($N=N+1$). At 134 the maximum of 10 iterations is registered. If it has been reached by 143, the inner loop operation is switched out, and the major loop at 160 (FIG. 5D) is given another turn ($AD=AN+1$). Until that time, the EVOP inner loop is exercised from 135 on (FIG. 5B) by the microprocessor as follows:

At 135 the value for line 1 and column 2, namely $A(1,2)$ is checked against the minimum acceptable for condenser flow C1. In this regard, equation #16 of Table II indicates that C1 should not be less than 10,000 lbs/hour.

It is assumed: there is control possible in the system at 128, e.g. by 168 the minor iteration loop can be energized at B; the performance criterion PERCT has been initialized by putting it to zero at 131, at 132 the first step of the minor iteration loop has been initialized by making $N=0$. Now, at 133, the additional steps are initiated ($N=N+1$). Upon each such step, the layout of rows and columns of Table IV is examined and for each row the costs are established (cost 1 through cost 4). The costs so determined are computed to ascertain which line has the highest cost from row 1 to row 4. Having found out one row of highest cost, the average for each variable in the remaining three rows is calculated, doubled, then the value of the variable in the highest cost situation, or worst case, is subtracted therefrom. When this has been established for each column (EX1, C1, C2), this is taken as a "new base case" which is now used for the next iteration step (N+1). As shown by step 134, this procedure is pursued only ten times for the initial given value of delta ($a_1$, $a_2$, $a_3$). If this number is exceeded, by 143 and 165, the system goes to D (FIG. 5D) where delta is made smaller and smaller while operating the process. Thus, for say $a_1$, the successive values of delta are chosen to be $a_1$, $a_{1/2}$, $a_{1/3}$, $a_{1/4}$ (see 162 in FIG. 5D).

Before starting the minor loop iteration step, however, adjustments are made with the microprocessor in order to ascertain whether any of the variables under perturbation fall under the constraints. $A(1,1)$, $A(1,2)$ and $A(1,3)$ represent the values of the variable of row 1 and the respective columns 1, 2 and 3, according to step 123. These three constraints are as defined by line #16 for C1 (namely 10,000 lbs/hour) and by line #18 for C2 (namely 10,000 lbs/hour) according to Table III.

If $C1=A(1,2)>CONDMIN(1)$ at 135, the system goes by 107 to C. If not, the constraint is exercised by making $A(1,2)$ equal to the minimum CONDMIN(1) by 137 and 138, thereby accepting a penalty which will be compensated for by controlling the extraction EX1 if it is found possible at 139, to the extent that $EX1=A(1,1)$ is larger than the amount by which C1 has been increased at 138. When C1 is increased, power P1 is increased, whereas when EX1 is decreased, power P1 is increased, and conversely. Therefore, EX1 is diminished by the differential amount "Diff", derived at 137 relative to $A(1,2)$ for C1. Action upon EX1 is only possible, however, to the extent that $EX1=A(1,1)$ cannot be negative. This condition is ascertained at 141. If at 151 $A(1,1)<0$, at 142, $A(1,1)$ is made equal to zero, and the system goes to 145 by 167, where the constraint on $C2=A(1,3)$ is ascertained (CONDMIN(2)). Should, at 145, the difference between $A(1,3)$ and COND-MIN(2) be positive, control with condenser C2 is possible. Otherwise a penalty is accepted at 147 by making $C2=A(1,3)=CONDMIN(2)$, e.g., 10,000 lbs/hour in this instance.

At this point, from 167, the inner loop proper can be exercised as follows:

At 146 there is a call for a calculation of power (P1, P2) which is effected at E and by line 159 in FIG. 5E, as seen hereinafter. The throttle flows T1, T2 are determined as of now, in accordance with 103, and on account of the values sensed or deducted (EX1, EX2, C1, C2, P1, P2). Now at 148 the matrix of Table IV is loaded into rows 2-4 with the values $a_1$, $a_2$, $a_3$ in accordance with row 1. The resulting flow values are ascertained at 149. From T1, T2, EX1, EX2, C1, C2 the values of P1 and P2 are determined by E in FIG. 5E and steps 170 thereof on. To this effect, the throttle equations are used, at 173 for TG5 and at 175 for TG6, and at 174 more generally. At the same time, it is ascertained whether the governor of TG5 (at 171), or the governor of TG6 (at 172), is on AUTO. If TG5 is on AUTO at 171, the throttle flow T1 is adjusted automatically. If not by 173, TH1 is manually set to the calculated value T1. If TG6 is on AUTO at 172, the throttle flow T2 is adjusted automatically. Otherwise, by 175, TH1 is manually set to the calculated value T2.

On the basis of the information obtained with T1, T2, EX1, EX2, C1, C2, the respective values of P1 and P2 for TG5 and TG6 are calculated at 174. In so doing, it is ascertained, however, whether the constraints of Table III for power of line #4 ($P1 \leq 9500$), line #7 ($P2 \leq 9500$), line #15 ($P1 \geq 4000$) and line #17 ($P2 \geq 3000$) are respected. To this effect at 178 the minima of P1 and P2 are exercised manually (after 176 if the corresponding governor is not on AUTO), so that $Power(I)=PMIN(I)$ if it falls below the minimum. The maxima of P1 and P2 are exercised at 180 and manually $POWER(I)=PMAX(I)$ if the maximum is exceeded. On the basis of such assigned values for P1 and P2, the corresponding throttle values T1 and T2 are calculated at 181 from the throttle equation. This may lead to zero power P1, P2 as will appear at 183, and at zero throttle flow in such case, at 184. The system then goes to G. The system also goes to G if P1, P2 remain between maximum and maximum as ascertained at 177.

Having determined P1 and P2 (FIG. 5E) the microprocessor can determine whether additional power $P_{TL}$ is needed from tie-line TL in order to satisfy the power demand PD. This is found at 187 (FIG. 5F). $P_{TL}$ is compared to the minimum power to be purchased at 188. If $P_{TL}$ is smaller than such minimum at 188, the minimum is accepted as a penalty at 190. Then at step 189 it is ascertained whether the calculated throttle flow (T1, T2) exceeds the maximum flow possible through TH1, TH2. If it is exceeded, the throttle estimate is accepted as a penalty reflecting the excessive demand of steam. Finally, the minor iteration loop initiated at 133 ($N=N+1$) is terminated by calculating the costs for rows 1-4 at 191, in accordance with step 150 of FIG. 5C. From such cost values in rows 1-4 of the matrix of Table IV the worst case is set aside at 151.

As stated above, at 152, the average of the three other lines is made. The average is doubled and the value of the worst case is subtracted, thereby obtaining at 158 a new base case for the new step N preceding at 133 step $N+1$. At 153 it is ascertained whether the improvement with the new case is 21 0.2, indicating a convergence. If it is, the system goes to step $AN=AN+1$ by 165 for another major iteration step.

If the improvement is large enough (>0.2), the system at 154 updates the performance criterion PERCT at 131, and the minor loop iteration is continued as before ($N=N+1$) until $N>10$, at which time, by 143, the system effects another major loop iteration (FIG. 5D).

When the major, or outer loop, is exercised, at 160 the introduced perturbation delta (WDEL(I)) is each time at 162 divided by AN1,2,3,4 for the successive steps thereof. Before taking a new value of delta ($a_1$, $a_{1/2}$, $a_{1/3}$, $a_{1/4}$, and the source for $a_2$, $a_3$) it is checked whether the perturbation C1, or C2, becomes smaller than the minimum. If no decrease is made, $WDEL(I)=0$, at 103. Upon each new line or experimentation under a fractional increment, the new line 1 in the matrix of Table IV is made equal to the preceding base case minus the new perturbation WDEL(I), at 164. After such step $AN=AN+1$ at 160, the system goes to the minor loop for further testing (FIG. 5C) with ten possible iteration steps as illustrated at 134.

It is observed that the constraints are handled as penalties (higher costs) if high throttle flow or low tie-line power are encountered in a test set. If condenser flow or power encounter constraints, then values are adjusted and throttle flow recalculated so as to generate the appropriate cost within a constrained but valid data set, i.e., in conformity with the model.

If a device is on Manual, the perturbation delta is forced to zero. Similarly, if an extraction flow reaches a limit, or if a condenser flow reaches a minimum, the associated delta is set to zero. By so doing, it becomes locked and virtually removed from the optimizing procedure.

The invention has been described in the context of steam turbines. It is understood, however, that the EVOP method of controlling the distribution of steam and of power is applicable to the optimization of operation of one or more combustion turbines, as well. In such case, the condenser no longr exists. Any consideration of condenser flow is then replaced by consideration of an exhaust of the turbine. It is also observed that the EVOP method described in a situation where the throttle to power relationship can be considered as linear, is applicable even when such relationship is non-linear. This is another advantage of the optimization method according to the present invention, that it is not so limited, as the case would be with conventional linear programming techniques, for instance, and therefore can meet less ideal situations of non-linearity.

Referring again to FIG. 2, there is shown there associated with the computer system used to implement the optimization method according to the present invention, a demand controller TLC to implement demand control according to U.S. Pat. No. 3,872,286 of R. E. Putman issued Mar. 18, 1975. For the purpose of this application, the Putman patent is hereby incorporated by reference. In that patent, the demand controller TLC is responsive on line 56 to commands from the computer system block CMP to derive on line 57 an excess demand $\Delta P$ requiring that specific electric loads in the plant be shed, so as to maintain the total electric demand below an assigned limit DL, as explained in the above-stated Putman patent. Interruptible loads in the plant represent a definite amount of power consumed under specific switching constraints. The demand control system takes into account priorities established between such loads and the constraints imposed by the loads, when determining whether a load, by line 98, should be switched ON, or shed, in order to maximize production while keeping the consumption under an assigned limit during each billing period. In the context of the present optimization method for cogeneration, the amount of power cogenerated is material to the extent that the power demanded from the tie-line $P_{TL}$ is within or would exceed the requirements for demand control.

Should demand PD be seen to be excessive from predictions made during a 15-minute period, the power P1 on turbine TG5 would be increased above the previously calculated minimum up to the limit of load. Subsequently the load or turbine TG6 would be increased, should turbine TG5 not be able to sustain the required additional load.

A demand control program is provided, the output of which is superimposed as a subprogram on the minimum condenser flow solution of the optimization program by means of an integrator. As stated in the demand control section of the Appendix:
TINPER = TINPER + 20.0
DEMPJO=4.0 * (ENGPRCH+POWER * (DEMPER-TINPER)/3600)
ERROR = DEMPJO – DEMLIM
N = IFIX(ERROR ALDINCR)
ADDLOAD = ADDLOAD + FLOAT (N) * ADLINCR
IF (ADDLOAD.LT. 0.0) ADDLOAD=0.0
WHERE:
TINPER = time into period (secs.)
DEMPER = demand period (secs.)
ENGPRCH = calculated amount of energy purchased this period (KWH)
POWER = utility tie-line power (KW) e.g. $P_{TL}$
DEMPJO = projected demand at end of 15-minute period (KW)
DEMLIM = present 15-minute period demand limit (KW)
ALDINCR = pseudo load increment (KW)
ADDLOAD = load to be added to turbine with lowest condensing power steaming rate (KW)

Figure 5G:
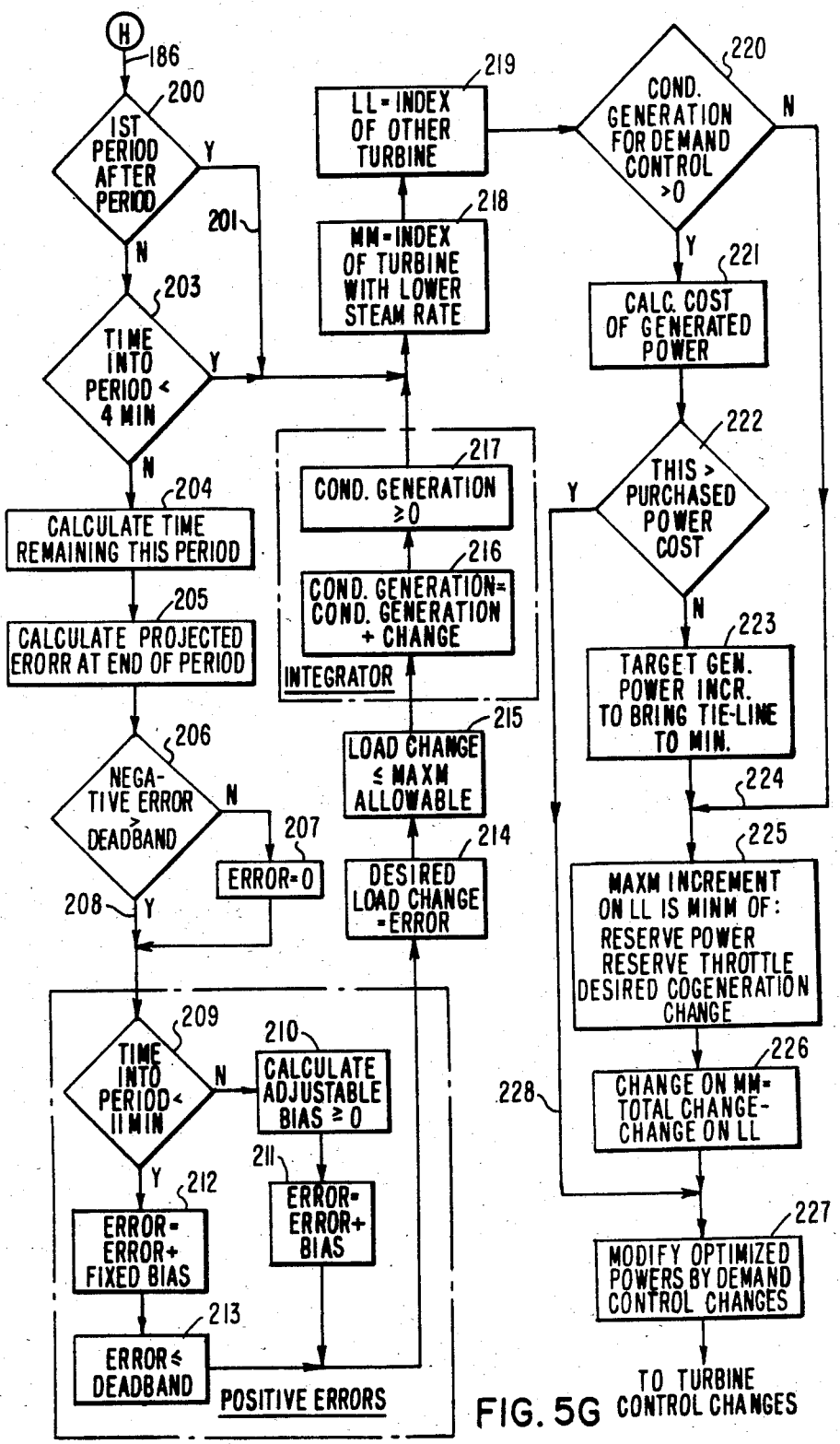
FIG. 5G is a flow chart combining demand control and turbine control pursuant to FIGS. 4, 4A, 6, 7A, 7B and 8-9.

Referring to FIG. 5G, when at step 185 of FIG. 5C an optimal solution has been found, the system goes by line 186 to step 200 of FIG. 5G which is part of the demand control program operation. Demand control is effected as explained in the incorporated by reference U.S. patent of R. E. Putman, during successive demand periods of say 15 minutes, to see whether the demand is targeted above or below the demand limit DL, calculate the error, exercise a deadband for no control, introduce a bias and decide to select interruptible loads to be shed according to a priority order and weights. The demand period is initiated by a pulse from the demand wattmeter of the utility company sent every 15 minutes. The demand period is typically divided into three elementary periods. The "first period" is a nocontrol zone which lasts, typically four minutes. The "second period" is a period in which the demand limit includes a fixed bias, and in which the deadband is exercised. It is a zone of control which lasts typically seven minutes, that is, eleven minutes from the fifteen minutes total. The "third period" is the remaining time in the demand period, during which the bias is adjusted down to zero at the end of the demand period and the upper deadband eliminated.

Demand control is performed when the answer to question 200 is NO. Then, at 203 it is determined whether the time period is less than four minutes ("first period"). If it is NO, the system goes to 204 at which step the time remaining in the demand period is calculated. At 205 the projected error is calculated at the end of the period. At 206 the deadband is exercised if there is a negative error which is smaller than the deadband, that is at 207 the error is made zero. Otherwise by 208 the system goes to 209 where the time into the demand period is found to be less or more than eleven minutes ("second period" or not). In the "second period" the system at 212 exercises the fixed bias by adding it to the error and at 213 the deadband is exercised. After the "second period" has lapsed, at 210 the adjustable bias is varied down to zero, and at 211 the error is added to the bias. From 213 ("second period") or from 211 ("third period") the system goes to 214 where the load change is recognized in accordance with the error.

When demand control is not to be exercised (YES at 200, YES at 203), the system goes to 218 from 186, e.g. in accordance with the requirement to optimize control of the turbogenerator units. If demand control is to be exercised, namely at 214 a load change is required equal to the error of 211 or of 213, either interruptible loads will be shed according to the priority schedule as explained in the Putman patent, thereby not to exceed the demand limit DL, or the turbogenerator units will be used in order to shift power consumed from the tie-line to the cogeneration group. In the latter instance, the system goes to 215 where it is ascertained whether the load change is less than the maximum allowable change.

Demand control has been described by reference to FIGS. 2 and 5G in the context of successive demand periods of constant duration (15 minutes in this instance). It is understood, however, that such demand periods instead of being successive and adjacent may be overlapping in accordance with the technique of a continuously sliding window, each demand period being slightly shifted from the preceding one and from the following one.

At 216 and 217 an integrator function is introduced based on the assumption that condenser generation can possibly absorb the change. Therefore, at 216 condenser generation is made to include the change and at 217, the amount so ascertained is made superior or equal to zero.

At 218 and 219 the system responds both to a demand control change as ascertained at 214 or to an optimization control change ascertined at 186 via 201. This is the situation expressed at the summing points 307 and 308 of FIG. 8.

At 218 is identified and indexed as LL, the turbine with the lower steam rate, that is, the one for which it is cheaper to consume steam in generating power. At 219 is identified and indexed as MM, the other turbine, namely the one for which the steam rate is higher. If the condenser generation is not positive at 220, i.e. no demand control needs to be satisfied, it may be possible to cut back on purchased power $P_{TL}$ it this is the more costly source of electrical energy. It is first determined at 221 what the cost of generated power will be. Then, at 222 this amount is compared to buying the same amount of power from the tie-line. If it is less expensive to cogenerate electrical power, at 223 that amount of power ($\Delta P1$ or $\Delta P2$) is produced in order to reduce the tie-line power $P_{TL}$ and reach the minimum needed.

At 225 either from 220 if the answer is YES or from 223, the maximum increase on LL is the lowest between the reserve power, the reserve turbogenerator and the desired condensing power change. Having determined the change of power to be derived from the low rate turbine LL, it is known at 226 that the change to be made on the other turbine MM is the difference between the total change and the change on turbine LL. At 227 the power outputs of the optimization program are, then, modified by these power changes. Finally, by 227, which is from step 226 or from step 222, the system goes to the turbine control program which, as explained in the afore-mentioned patent application, involves the difference array 325 of FIG. 6 and the contact control program 331 thereof.

The difference between actual and desired power generated in the above programs will be converted to a time duration of contact closure and control so implemented. Header pressures need to be monitored in order to avoid adjusting extraction set points outside the operating range. The system is designed to function even with one machine out of service. A clock is included for calculating time into the demand period and the period of this clock is reset automatically by the demand period pulse, as explained in the Putman patent. The following analog inputs are provided: throttle flow (one for each); high pressure extraction flow (one for each); low pressure extraction flow (one for each); condenser flow (one for each); the two turbine powers P1, P2; pressure reducing valve $VV_1$; header pressure (header HD #1) and tie-line power $P_{TL}$. The digital inputs are: the tie-line KWH meter pulse input and the demand period pulse input. The digital outputs consist of eight contact points. When implementing control for optimization according to this application and concurrently effecting demand control, (the latter according to U.S. Pat. No. 3,872,286 of R. E. Putman) a problem of stability arises in cogeneration systems of the type here described.

Power is generated by passing high pressure steam through turbogenerators to produce both power and process steam, pressure reducing valves are commonly included in the system. One of the pressure reducing valves functions is to satisfy an imbalance between total steam demand, and the steam flow through, and power from, the turbogenerators. For system stability these reducing valves normally possess a drooping characteristic, whereby a change in steam flow can only be produced by a change in process steam header pressure, or pressure controller setting. However, because pressure changes affect flow when control requires changing steam flow distribution and adjusting the turbine extraction valves, interactions will occur which will delay reaching a new equilibrium.

In order to overcome this, the technique of copending patent application Ser. No. 548,478 is used. This technique consists in anticipating steam flow distribution changes upon a given intended valve adjustment, such anticipation being taken into account when adjusting the turbine extraction valves. A program used for such anticipation resolves these interactions for a given set of desired changes to steam flow and power. As earlier stated, the program converts the corresponding changes in turbine governor and extraction valve settings to equivalent contact closure durations which are, then, implemented.

Power generated by the turbogenerators ($\Delta P1$, $\Delta P2$) may be the only variable controlled at times. At other times only steam flow changes are required ($\Delta EX1$, $\Delta EX2$). When both types of changes in the pressure settings such as at line 73 for $\Delta EX1$ and at line 72 for $\Delta P1$ in FIG. 4, and on similar lines for turbine TG6 and $\Delta EX2$, $\Delta P2$, a practical problem arises caused by the interaction between the control actuations through the process. When an optimum steam flow/power distribution has been determined by the EVOP system and is to be implemented, changing the setting of only one device at a time in a sequence requires numerous executions of the sequence before the new distribution is finally achieved for all flows. A method is now disclosed for resolving the inherent interactions between equipment i.e. "decoupling" them, prior to making any changes. The devices are then all adjusted simultaneously by the calculated amounts so that the desired set of net changes to the distribution is achieved in just one or two passes. By incorporating a dead band into the control strategy, the likelihood of this objective being achieved is increased.

Figure 6:
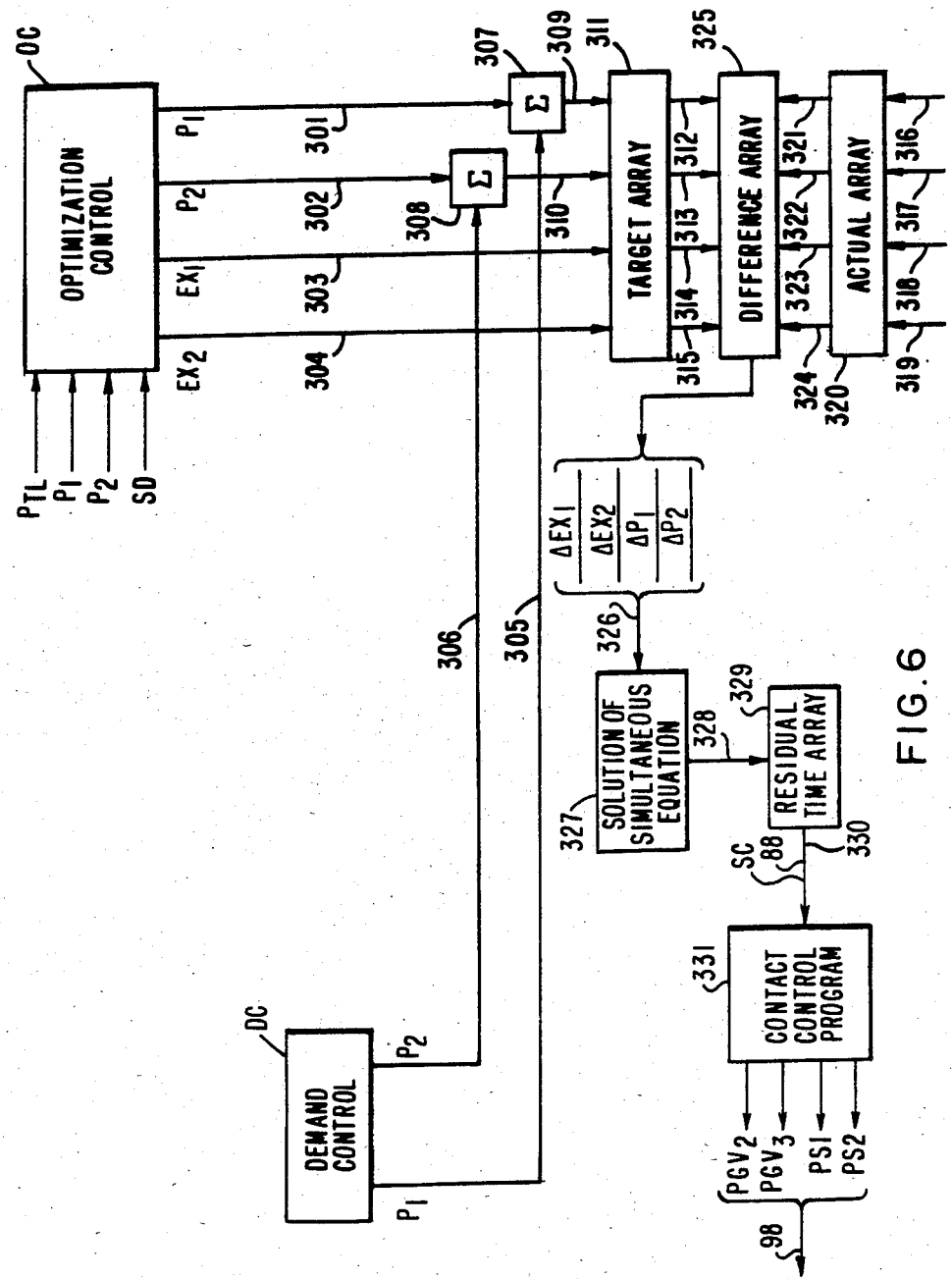
FIG. 6 shows in block diagram the flow of information in the turbine control program implementing the optimization system of FIGS. 1, 2 and 4.

An associated advantage of this strategy is that by minimizing the frequency of making changes to equipment settings, the life of the regulating devices is increased and maintenance reduced. The decoupling concept of control has been disclosed in another industrial process context in U.S. Pat. No. 4,500,950, however, in a different context. In that case, decoupling was between the control loop outputs. The decoupling concept is now implemented as shown in FIG. 6 by block 327 where the control decisions of block 325 in furtherance of optimization (DC) and demand control (DC), are treated mathematically by seeking a solution of simultaneous equations according to the Gauss-Jordan method. As a result, the process variables are simultaneously controlled according to the so modified control decisions. Accordingly, decoupling is achieved, and this is effected by control on the various change settings.

Illustratively, with process variables such as shown in FIGS. 2 and 4, namely the setting change $\Delta P1$ for the power cogenerated by turbine TG5, $\Delta EX1$ for the setting change in the extraction flow fed to the plant from TG5, $\Delta P2$ for TG6 and $\Delta EX2$ for TG6, control is according to the matrix given by Table V herebelow: Referring to the system of FIG. 6, the system of equations involved is represented by the matrix of Table V.

TABLE V

| 1<br>$\Delta P1$ | 2<br>$\Delta EX1$ | 3<br>$\Delta P2$ | 4<br>$\Delta EX2$ | ← Outputs to Governors/<br>Inputs from EVOP ↓ |
|---|---|---|---|---|
| 1 | −0.004 | | | $\Delta P1$ |

TABLE V-continued

| 1<br>$\Delta P1$ | 2<br>$\Delta EX1$ | 3<br>$\Delta P2$ | 4<br>$\Delta EX2$ | ← Outputs to Governors/<br>Inputs from EVOP ↓ |
|---|---|---|---|---|
| | 1 | | −0.01 | $\Delta EX1$ |
| | | 1 | −0.004 | $\Delta P2$ |
| | −0.01 | | 1 | $\Delta EX2$ |

Table V is a matrix showing the interaction upon a set of changes to be implemented.

Referring to FIG. 6, demand control is performed within block DC in response to power demand $P_{TL}$ (on line 330) from the turbine and a demand limit DL (on line 331) assigned to the plant, e.g. a limit in KWH not to be exceeded within the demand period, for instance, 15 minutes, provided by the wattmeter of the utility company. As a result, computation is performed within block DC in accordance with the teachings of the aforementioned U.S. Pat. No. 3,872,286 of R. E. Putman. The decision taken in block DC may be to change P1 and control turbogenerator TG5 (via line 305) accordingly, or to change P2 and control turbogenerator TG6 (via line 306) accordingly, or both. Assuming such a control, the set point setting for electrical generation by turbogenerator TG5 or by turbogenerator TG6, or for both, will be modified to a new count. Accordingly, on line 305 for TG5 and on line 306 for TG6, a signal representative of such control will be carried to respective summers 307 and 308. These summers are responsive by respective lines 301 and 302 to the control signals derived from the optimization control circuit OC for a power reference P1 for TG5 (line 301) and/or a power reference P2 for TG6 (line 302). Block OC is responsive to signals indicative of the power demand $PD=P1+P2+P_{TL}$ and to a signal indicative of the steam demand SD in the plant. According to the explanations heretofore given relative to the optimization technique between steam and electrical power, a new power P1 is prescribed on line 301 to summer 307 and a new power P2 is prescribed on line 302 to summer 308. Block OC also requires definite changes for optimization of steam flow. These signals appear on lines 303 and 304, respectively. The output signals for power derived from summers 307, 308, on lines 309, 310, for P1, P2 respectively, and those EX1, EX2 for steam on lines 303, 304, are inputted in a target array 311. Similarly, an actual array 320 is responsive to actual power representative signals on 316 for TG5, on 317 for TG6 and to actual steam flow indicative signals on line 318 for PRV1, on line 319 for PRV2. A difference array 325 compares the respective output lines 312-315 to the respective output lines 321-324 to provide on lines 326 the existing increments, or decrements, $\Delta EX1$, $\Delta EX2$, $\Delta P1$, $\Delta P2$. Within block 327 are solved simultaneously the equations involved in the array 325, typically using a Gauss-Jordan reduction algorithm. The residual time array 329 responsive by line 328 to the solution block 327, provides on line 330 the control requirement effected at 331 by the control program, namely, by establishing corrective set points PS1, PS2 (for loops GV1 of TG5 and GV2 of TG6, respectively in FIG. 2) to distribute powers P1, P2, and PGV2 (for PGV5 as shown in FIG. 4, for TG5), PGV3 (not shown, for TG6) to distribute the extraction flow EX1, EX2.

Figure 7A:
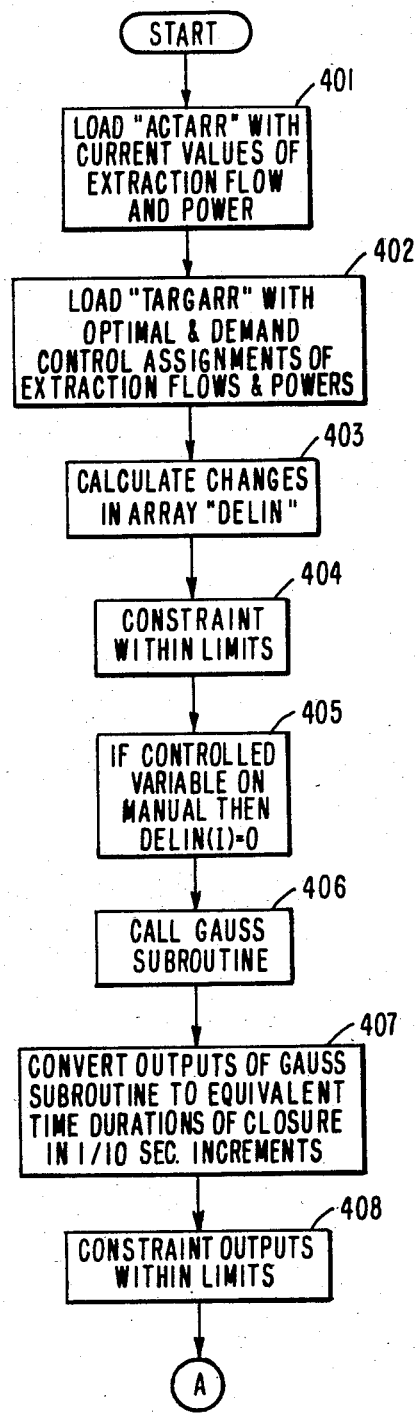
FIGS. 7A, 7B, 7C, and 8–9 are flow charts illustrating pressure control effected under optimization and/or demand control.

The turbogenerator control task is described in the "Turbine and Extraction Valve Control Section" of the Appendix. In this respect, referring to FIG. 7A, the task is first to calculate the decoupled outputs. To this effect, at 401 the actual load "ACTARR" (see 320 on FIG. 6) is ascertained with the current values of extraction flows (EX1, EX2) and powers (P1, P2) namely:

ACTARR (1)=GP TG5
ACTARR (2)=W38 TG5
ACTARR (3)=GP TG6
ACTARR (4)=W38 TG6

Then, at 403 the target values for the load (see 311 on FIG. 6) are ascertained, summing up the optimal and demand control assignments for the extraction flows (EX1, EX2) and powers (P1, P2). Thus:

TARGARR (1)=Power (1)
TARGARR (2)=W38 EXT (1)
TARGARR (3)=Power (2)
TARGARR (4)=W38 EXT (2).

At 403 the changes (see 325 on FIG. 6) are calculated in the array "DELIN", while at 404 such changes are constrained within assigned limits. At 405 is ascertained whether the controlled variable is on MANUAL, in such case $DELIN(I)=0$. At 406 the Gauss-Jordan subroutine is called for (see 327 on FIG. 6). At 407, the outputs (see 330 on FIG. 6) of the Gauss subroutine are converted (see 331 on FIG. 6) to equivalent time durations of closure in 1/10 sec increments. At 408 the outputs so derived are constrained within limits.

Figure 7B:
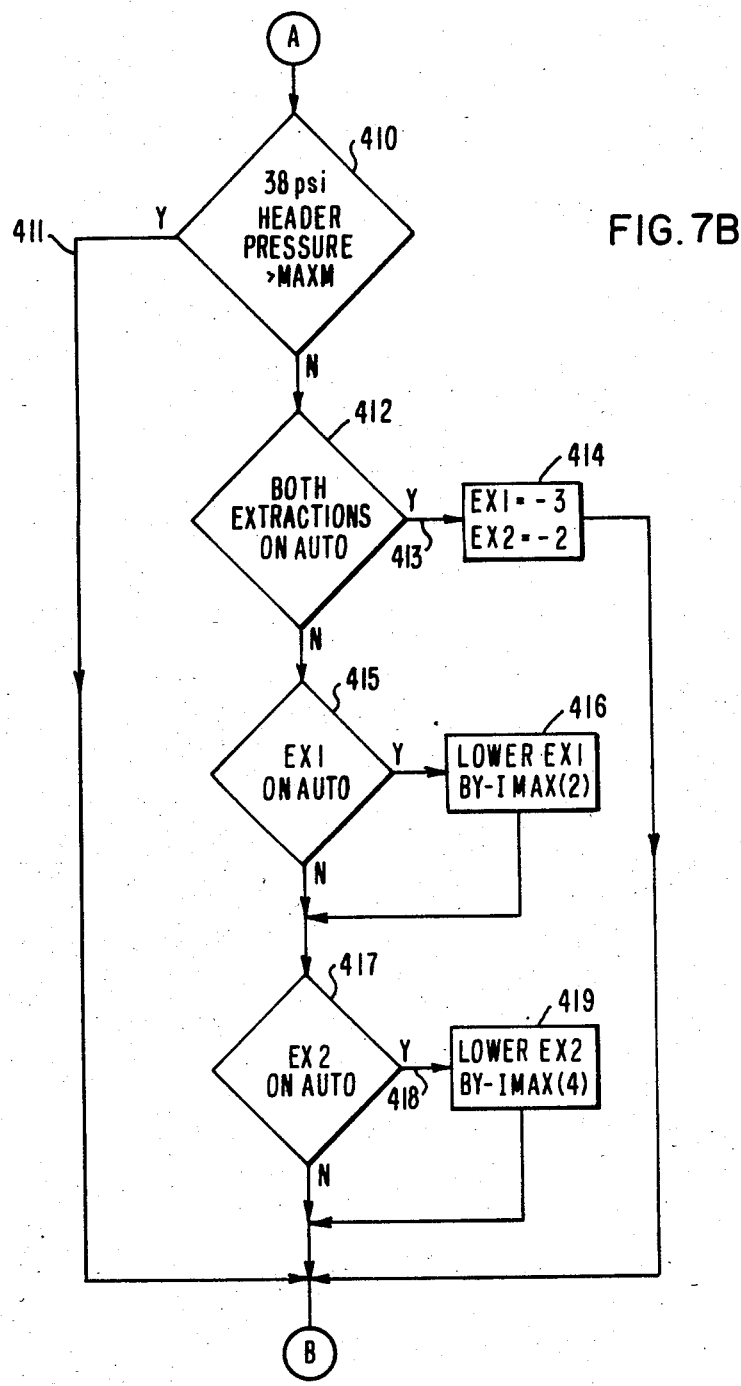

Referring to FIG. 7B, from 408, the system goes to 410 where the question arises whether the 38 psi header pressure is smaller than the maximum allowable. If it is, by 411 the system goes to 420 of FIG. 7C. If NO at 411, a procedure is initiated to check on the upper limit on the 38 psi header. Accordingly, at 412 the question is raised whether both extractions (EX1, EX2) are on AUTO. it is observed here that when the speed governor is on MANUAL, it is no longer possible for the turbogenerator to minimize the condenser flow, nor to control the distribution of power with that machine. It remains only to minimize the condenser flow of the other unit. If the answer is NO at 412, two possibilities: at 415 to ask whether EX1 is on AUTO, or at 417 whether EX2 is on AUTO. If it is YES to either one, the step is at 416 (for EX1) to lowr EX1 by −IMAX(2) or at 419 (for EX2) to lower EX2 by −IMAX(4). If the answer is YES at 412, the next step is at 414 to set $EX1=-3$ and $EX2=-2$.

Figure 7C:
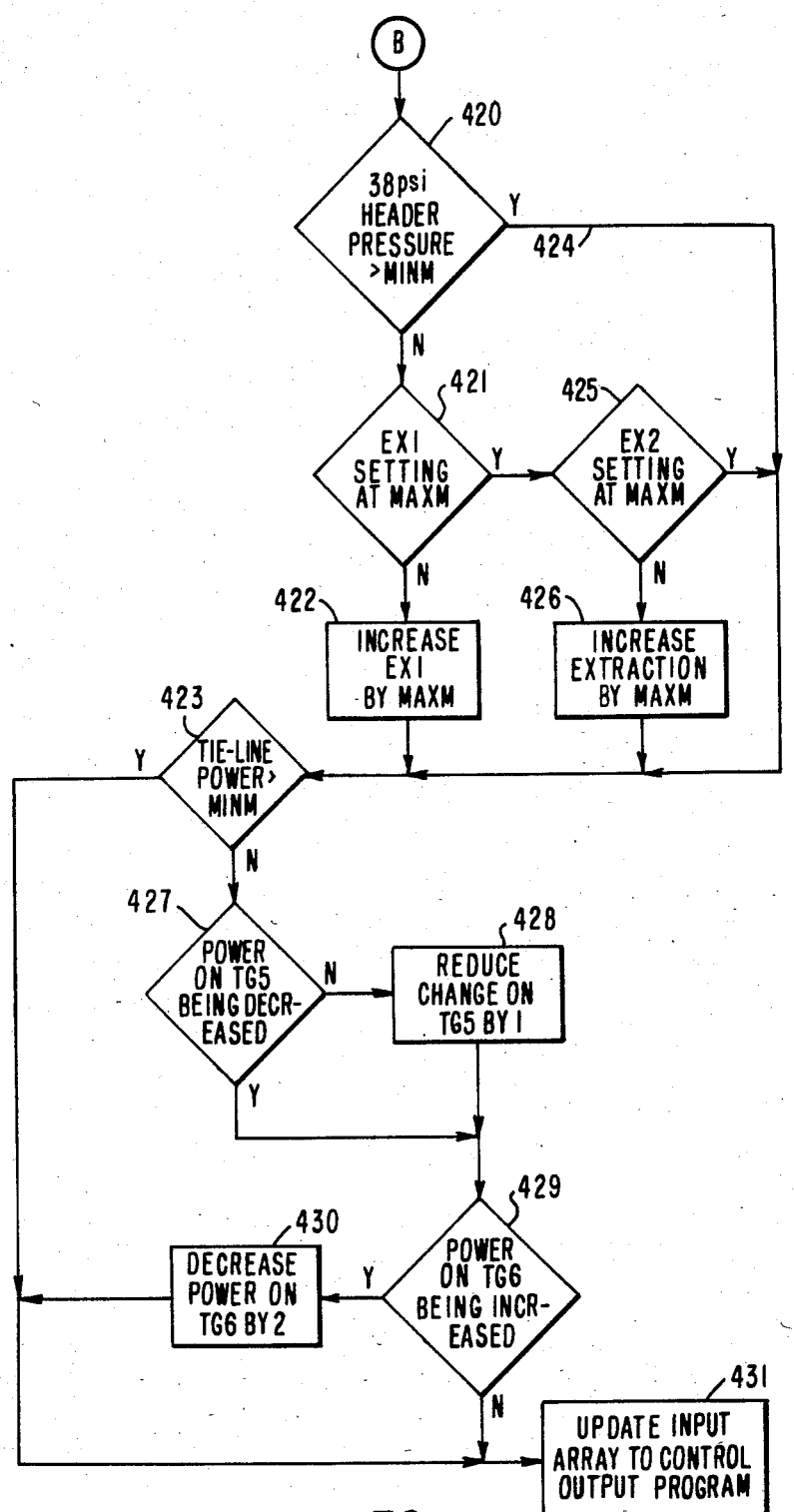

In all instances, the system goes to 420 of FIG. 7C. Referring to FIG. 7C, at 420 the question is whether the 38 psi header has a pressure larger than the minimum, and the subsequent step will be to check on the lower limit of the 38 psi header.

At 421, if the answer is NO at 420, the question becomes whether the setting for EX1 is at its maximum, e.g., wide open. If the answer is NO, the system will try to increase the generated power, in order to make more steam available to extraction. Thus at 422, EX1 is increased by maximum. Otherwise, action is on the other machine and at 425 the question becomes whether the setting of EX2 is at its maximum. If the answer is NO, at 426, EX2 is increased by its maximum.

By 424 from 420, or from 422, as well as from 426, the question becomes whether the tie-line power $P_{TL}$ is larger than the minimum limit assigned. If it is not so, at 427 steps will be taken to lower the generated power, therefore, to raise power $P_{TL}$. At 427 the question is whether the power on TG5 (P1) is being decreased. If so, at 429, the question is whether the power on TG6 (P2) is being increased. If NO, at 427, the change on TG5 is reduced by ONE. If YES, at 429, the power change on TG6 is decreased.

Figure 8:
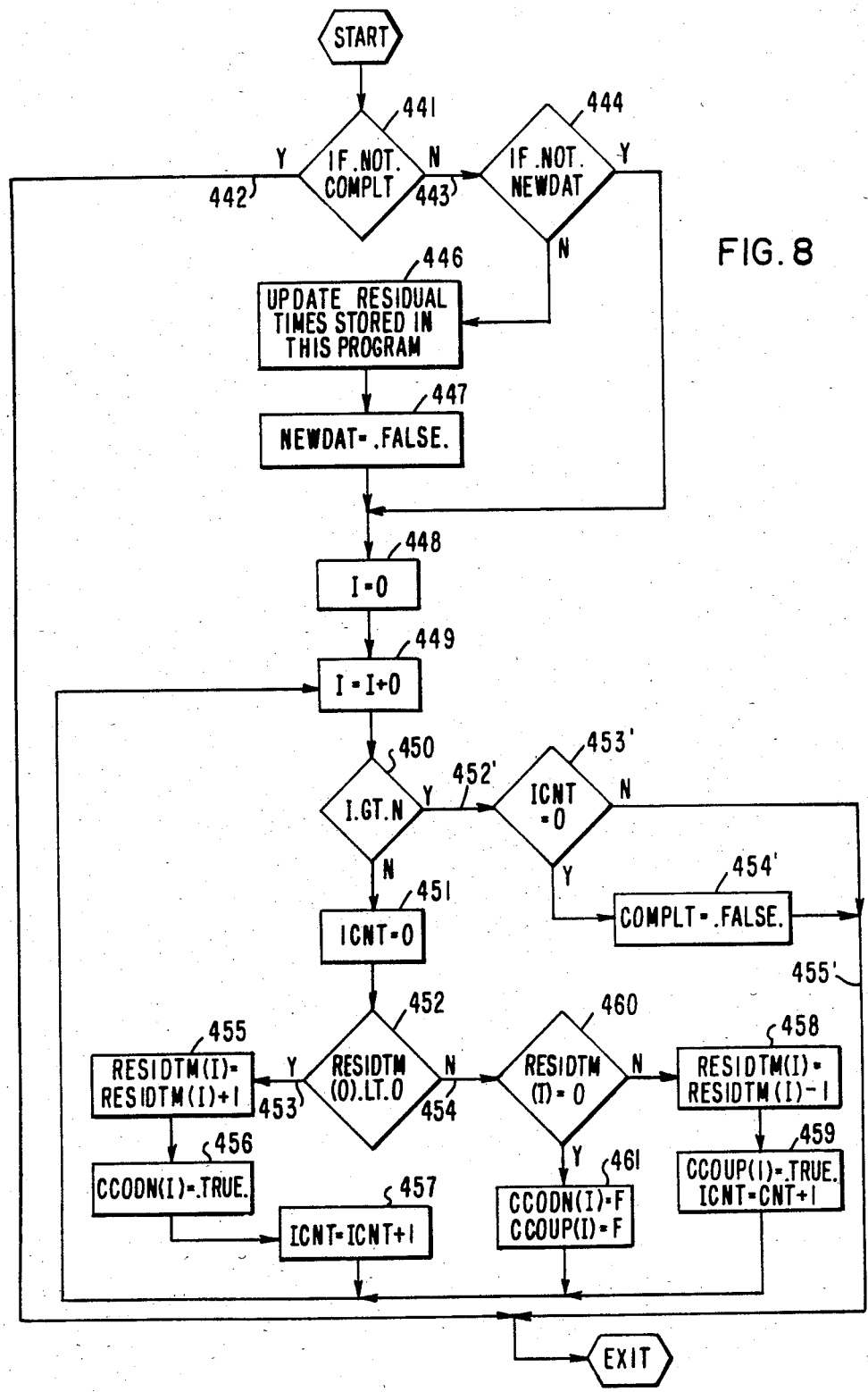
Figure 9:
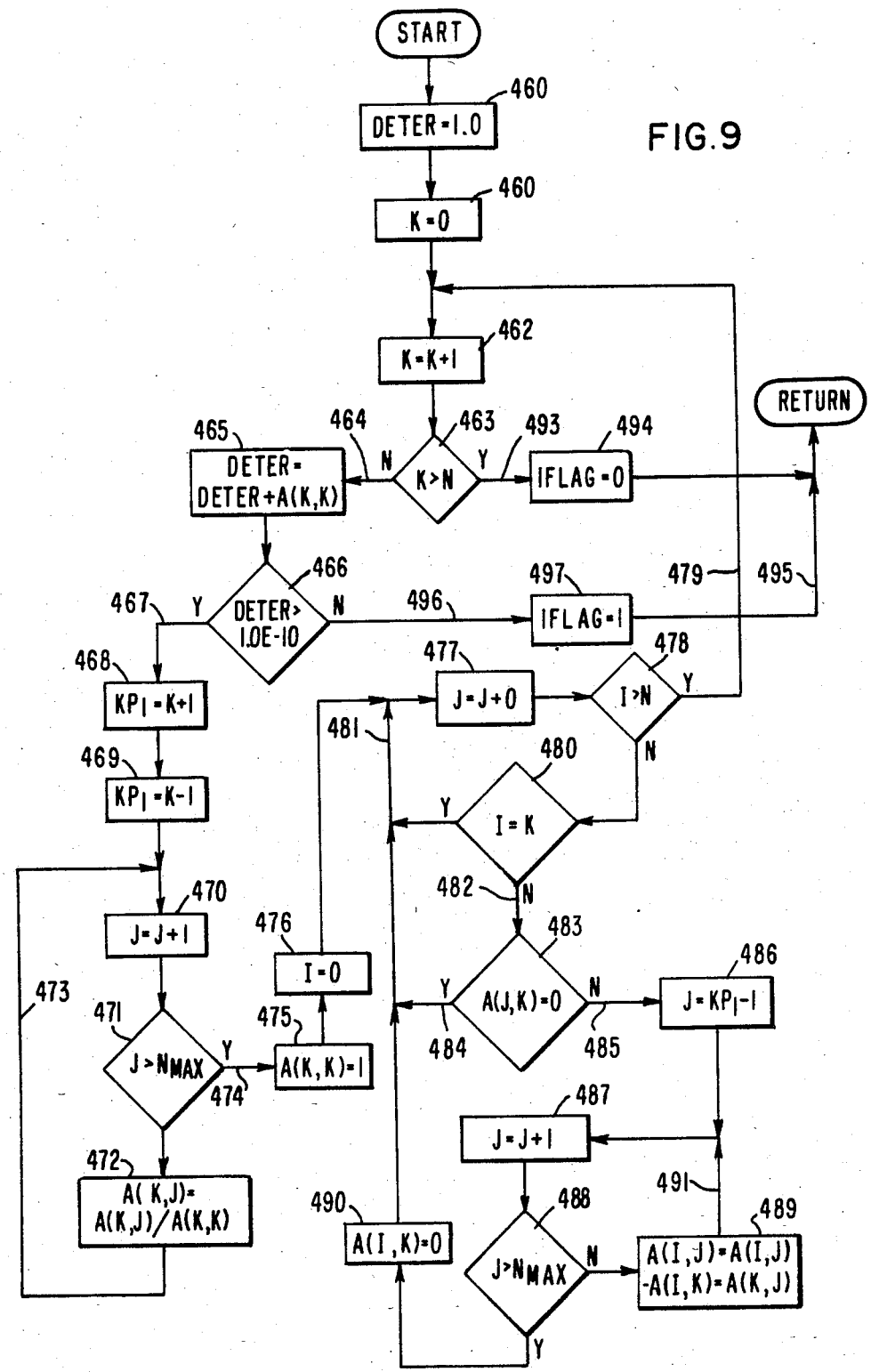

Thereafter, at 431, the inputs of the array (303, 304, 310, 311 in FIG. 6) are updated before passing to the output control program (FIGS. 8 and 9).

Referring to the Appendix, there is contained the Gauss-Jordan subroutine. Consider a set of simultaneous equations of the form:

$$2x_1 - 7x_2 + 4x_3 = 9$$

$$x_1 + 9x_2 - 6x_3 = 1$$

$$-3x_1 + 8x_2 + 5x_3 = 6$$

The solution procedure is given step by step by tables B-K and by the algorithm illustrated by the flow chart of FIG. 9.

The Gauss-Jordan method of solving a system of n simultaneous equations in the n unknown is explained in Chapter 5, pages 269–296 of "Applied Numerical Methods" by B. Carnahan, H. A. Luther and J. O. Wilkes published by John Wiley & Sons, 1969. The aforementioned pages of this 1969 publication are hereby incorporated by reference.

The Gauss-Jordan subroutine, found in the Appendix, finds the solution vector corresponding to a set of N simultaneous linear equations using the Gauss-Jordan reduction algorithm with the diagonal pivot strategy. The subroutine begins by first copying the source matrix Q1 into the working matrix Q2. Referring now to matrix Q2, the N by N+1 matrix of coefficients appears in the first N columns of matrix 'Q2(N,N1)', the N1-th column containing the right-hand vector. ON the K-th pass of the elimination scheme, K-th row elements are normalized by dividing by the pivot element Q2(K.K). "DETER", the determinant of the coefficient matrix, is updated prior to elimination of all non-zero elements (except for the pivot element) in the K-th column. Should a pivot element be encountered which is smaller in magnitude than "REF", computation is discontinued and "IFLAG" is made equal to unity, so permitting an appropriate comment to be printed by the calling program. Otherwise, "IFLAG" is returned with its value zero.

Starting with the matrix of Table B with the coefficients from the aforestated set of simultaneous equations:

TABLE B

|   | 1 | 2 | 3 | 4 |
|---|---|---|---|---|
| 1 | 2 | −7 | 4 | 9 |
| 2 | 1 | 9 | −6 | 1 |
| 3 | −3 | 8 | 5 | 6 |

The procedure consists in dividing the first row by A(1,1) leading to Table C.

TABLE C

|   | 1 | 2 | 3 | 4 |
|---|---|---|---|---|
| 1 | 1 | −7/2 | 2 | 9/2 |
| 2 | 1 | 9 | −6 | 1 |
| 3 | −3 | 8 | 5 | 6 |

Then, the first row is subtracted from the second row and the difference is stored in the second row. This is Table D.

TABLE D

|   | 1 | 2 | 3 | 4 |
|---|---|---|---|---|
| 1 | 1 | −7/2 | 2 | 9/2 |

TABLE D-continued

|   | 1  | 2    | 3  | 4    |
|---|----|------|----|------|
| 2 | 0  | 25/2 | −8 | −7/2 |
| 3 | −3 | 8    | 5  | 6    |

Table E is obtained by multiplying the new first row by A(1,3) and effectuating a subtraction from the third row.

TABLE E

|   | 1 | 2    | 3  | 4    |
|---|---|------|----|------|
| 1 | 1 | −7/2 | 2  | 9/2  |
| 2 | 0 | 25/2 | −8 | −7/2 |
| 3 | 0 | −5/2 | 11 | 39/2 |

The second row is normalized by dividing by A(2,2), which provides Table F.

TABLE F

|   | 1 | 2    | 3      | 4     |
|---|---|------|--------|-------|
| 1 | 1 | −7/2 | 2      | 9/2   |
| 2 | 0 | 1    | −16/25 | −7/25 |
| 3 | 0 | −5/2 | 11     | 39/2  |

Thereafter, the new second row is multiplied by A(2,1) and the subtraction made from the first row. The difference is stored in the first row. This is Table G.

TABLE G

|   | 1 | 2    | 3      | 4     |
|---|---|------|--------|-------|
| 1 | 1 | 0    | −6/25  | 88/25 |
| 2 | 0 | 1    | −16/25 | −7/25 |
| 3 | 0 | −5/2 | 11     | 39/2  |

The procedure followed thereafter consists in multiplying the new second row by A(2,3) and subtracting from the third row, storing the difference in the third row. This is Table H.

TABLE H

|   | 1 | 2 | 3      | 4     |
|---|---|---|--------|-------|
| 1 | 1 | 0 | −6/25  | 88/25 |
| 2 | 0 | 1 | −16/25 | −7/25 |
| 3 | 0 | 0 | 47/5   | 94/5  |

Table I is obtained by normalizing the third row by dividing by A(3,3).

TABLE I

|   | 1 | 2 | 3      | 4     |
|---|---|---|--------|-------|
| 1 | 1 | 0 | −6/25  | 88/25 |
| 2 | 0 | 1 | −16/25 | −7/25 |
| 3 | 0 | 0 | 1      | 2     |

Table J is formed by multiplying the third row by A(3,1) and subtracting from the first row.

TABLE J

|   | 1 | 2 | 3      | 4     |
|---|---|---|--------|-------|
| 1 | 1 | 0 | 0      | 4     |
| 2 | 0 | 1 | −16/25 | −7/25 |
| 3 | 0 | 0 | 1      | 2     |

Next, the third row is multiplied by A(3,2) and subtracted from the second row.

TABLE K

|   | 1 | 2 | 3 | 4 |
|---|---|---|---|---|
| 1 | 1 | 0 | 0 | 4 |
| 2 | 0 | 1 | 0 | 1 |
| 3 | 0 | 0 | 1 | 2 |

The subroutine is illustrated by the flow chart of FIG. 9, where N is the number of rows (three, in the numerical example) and the number of columns is at maximum N+1 (four, in the example). At 460 the determinant $DETER=1.0$ at 461 to initialize the row count $K=D$. At step 462 the iteration is $K=K+1$, with at 463 the question whether K exceeds N. If YES at 493 at 494 the flag is set $IFLAG=0$ and there is a return by 495. If NO at 463, the step at 465 is to have $DETER=DETER+ A(K,K)$ effected. Until DETER has been reduced to $1.0E-10$, namely at 466, at 468 by 457, $KP1=K+1$ is effected and $J=KP1-1$ at 469. The loop at 470 is $J=J+1$ which is run by 472 and 473 until $J>NMAX$ at 471. At 472 the step defines $A(K,J)=A(K,J)/A(K,K)$. When $J>NMAX$ at 471, the system goes by 474 to 475 where $A(K,K)=1$, and at 476, $I=0$ is set in order to initiate the iteration $I=I+1$ at 477. When $I>N$ at 478 the system returns by 479 to 462 for another iteration $K=K+1$. When I does not exceed N at 478, the question is raised at 480 whether $I=K$. If it does, by 481 the iteration is repeated by 481 and 477. If it does not, the question becomes "$A(J,K)=0.9$" at 483. If it does by 484 and 481 the iteration of step 477 is repeated. Otherwise by 485 the system goes to step 486 where $J=KP1-1$, then $J=J+1$ at 487 and until J is no longer larger than $N_{MAX}$ (at 488) the system returns by 492 and 481 to step 477. If NO at 488, we have at 489: $A(J,J)=A(I,J)-A(I,K)\times A(K,J)$. Finally, at 490 A(I,K) is made equal to zero, before returning to 477 by 491 and 481.

If at 466, DETER is not larger than $1.0E-10$, by 496 the flag is reset $(IFLAG=1)$ and the system returns by 495.

Referring to FIG. 8, and to the Appendix section called "Subroutine CCOCON" the object here is to set up the desired bit pattern in the register "CCO" and then to make just one I/D call, thus every 1/10 sec. The philosophy of control here is to start all the changes on the contactor settings at the same time. There is no change within the 20 second time period that the system is ascertaining the new changes, thereby to achieve stability and, through decoupling, reaching the desired optimum quickly.

Referring to FIG. 8 and to the COCON subroutine of the Appendix, this program is bid regardless every one-tenth second (0.1 sec). If at 442 of FIG. 11 flag COMPLT is false, the program immediately at 442 branches to CALL EXIT so that duty cycle will only be consumed when a contact has to remain closed. Otherwise, by 443, if at 444 on checking NEWDAT, new data is found to be present (NEWDAT=TRUE), by 445 the NEWRESID array is at 446 transferred to the RESIDTM array, after which at 447 NEWDATA is set false at 449, $I=I+1$. At 450 is determined whether $I>N$. If not, ICNT is made equal to zero at 451. At 451 ICNT is then forced to zero before Do Loop #1 at 452 is exercised. For eacn contact in turn, the sign of RESIDTM(I) is first checked, negative by 453 indicating the set point is to be lowered, while positive by 454 indicates that the set point is to be raised.

If lowered, RESIDTM(I) is at 455 incremented (i.e. up towards zero, being negative), CCODN(I) is made true at 456, and at 457 ICNT is incremented.

If raised, RESIDTM(I) is at 458 decremented (i.e. down towards zero, being positive), CCOUP(I) is at 459 made true, and ICNT incremented also at 459.

Should RESIDTM(I) be zero, as seen at 460, the program branches to statement #3 and causes at 461 both CCOUP(I) and CCODN(I) to be made false.

Should ICNT be still zero at 453, at the end of the program, this means that all RESIDTM(I) are now zero and flag CMPLT can now be cleared, permitting CCO-CON to branch immediately by 455 to EXIT the new time it is called. CMPLT will be set again if a new adjustment to one of the devices is to be made.

FIG. 4 illustrates extraction control on a turbine provided with an hydraulic governor system. There, electrical control signals representing a desired change for each process variable are derived from the optimization circuit or from the demand controller and applied to the control system so as to change control settings. The control signals are applied to servo-motors actuating contactors after converting into a time mode the magnitude of the intended change. Therefore, the governor system is periodically and discontinuously adjusted in effecting the changes expressed by the computer system for optimization, and/or demand control.

The invention is applicable, however, with another type of turbine control system, in particular where control is in accordance with analog control signals, e.g. signals which continuously fluctuate in magnitude to reflect the desired parameter in absolute value: throttle flow, extraction flow, power in terms of flow. This is the case in practice, where the steam turbine includes a Woodward electric governing extraction control, as generally known.

```
0001: 0000   C
0002:        C       SCHEMATIC PROGRAM FOR A TIE LINE CONTROLLER
0003:        C
0004:        C       OPTIMIZATION SECTION - SSDEVOPT METHOD
0005:        C
0006:                REAL COEF(4,2),WMAX(2),PMAX(2),PMIN(2),THROTL(2),CONDMIN(2)
0007:                REAL W38EXT(2),POWER(2),WHP(2),COND(2),RESP(5),DELTA(4),DEL(4)
0008:                REAL W38MIN(2),W38MAX(2),TOT(5),A(5,5),W3ANEW(2),REF(4)
0009:                LOGICAL AM(6),FIRSTPUL,EX5ULMT,EX6ULMT
0010:        C
0011:                REAL ACTARR(4),TARGARR(4),DELIN(4),DELOUT(4),DELMAX(4),MATR(4,5)
0012:                REAL ERRTM(4)
0013:                INTEGER IARR(4),IMAX(4)
0014:        C
0015:                EQUIVALENCE (MATR(1,5),DELOUT(1)),(MATR(1,5),DELIN(1))
0016:        C
0017:                COMMON/TURBCOM/COEF,WMAX,PMAX,PMIN,CONDMIN,W38MIN,W3AMAX
0018:                COMMON/COSTCOM/TOTPWR,STMCST,PWRCST,TIEMIN
0019:                EQUIVALENCE (A(1,4),RESP(1))
0020:                DATA DELTA/1000.,1000.,1000.,0.0/
0021:        C
0022:        C       AM(1) = TG5 THROTTLE STATUS
0023:        C       AM(2) = TG5 38# EXTR. STATUS
0024:        C       AM(3) = TG6 THROTTLE STATUS
0025:        C       AM(4) = TG6 38# EXTR. STATUS
0026:        C
0027:        C       AM(1) - AM(4) .TRUE. WHEN LOOP IN AUTOMATIC STATE
0028:        C
0029:        C       AM(5) = .FALSE. WHEN WHOLE SYSTEM ON MANUAL CONTROL
0030:        C       AM(6) = BECOMES .TRUE. WHEN EITHER EXTRACTION EXCEEDS ITS LIMIT
0031:        C
0032:        C
0033:                THROTL(1)=153416.
0034: 0002           THROTL(2)=71194.
0035:                WHP(1)=138400.
0036:                WHP(2)=0.0
0037:                W38EXT(1)=10000.
0038:                W38EXT(2)=50380.
0039:                COND(1)=5016.
0040:                COND(2)=20314.
0041:                POWER(1)=4077.
0042:                POWER(2)=3492.
0043:                TIELINE=5243.

0044:        C
0045:                AM(1)=.TRUE.
0046:                AM(2)=.TRUE.
0047:                AM(3)=.TRUE.
0048:                AM(4)=.TRUE.
0049:                AM(6)=.FALSE.
0050:        C
0051:        C
0052:        C       TEST CODE
0053:        C
0054: 0034   1101    READ(18,600) INDX,AM,PWRCST
0055: 0041           READ(18,601) INDX1,W38EXT(1),POWER(1),W3AEXT(2),POWER(2)
0056: 0054    600    FORMAT(I2,6L2,1X,4F12.4)
```

```
00057;              601 FORMAT(I2,13X,4F12.4)
00058;                  IF(POWER(1).EQ.0.) COND(1)=0.0
00059; 005C            IF(POWER(2).EQ.0.) COND(2)=0.0
00060; 0064            IF(INDX.EQ.0) GO TO 1100
00061; 0067   C
00062; 0068            DO 602 I=1,2
00063; 006A            THROTL(I)=COEF(1,I)+COEF(2,I)*WHP(I)+COEF(3,I)*W38EXT(I)
00064;                1  + COEF(4,I)*POWER(I)
00065;                 COND(I)=THROTL(I)-WHP(I)-W38EXT(I)
00066;                 IF(COND(I).LT.0.0) COND(I)=0.0
00067; 00DA           602 CONTINUE
00068;          C
00069;          C      INITIAL LOGIC DEVELOPED FROM LOOP AUTO/MANUAL STATUS
00070;          C
00071; 00DE            IF(AM(1).OR.AM(3)) AM(5)=.TRUE.
00072; 00E6            IF(AM(6)) AM(5)=.FALSE.
00073; 00E9            IF(.NOT.AM(1).AND..NOT.AM(3)) AM(5)=.FALSE.
00074; 00F3         72 IF(.NOT.AM(5)) GO TO 1000
00075; 00F6   C
00076; 00F8            IF(AM(1)) GO TO 75
00077; 00FC            AM(2)=.FALSE.
00078; 00FD         75 IF(AM(3)) GO TO 73
00079; 0101            AM(4)=.FALSE.
00080;          C ***** SET EXTRACTION FLOWS AND OPTIMIZE POWER WITH TG6 ONLY
00081; 0102         73 CONTINUE
00082;          C
00083;                 REFCST=10000.
00084;                 AN=1.0
00085;                 TOTPWR=POWER(1)+POWER(2)+TIELINE
00086;                 TOTEXT=W38EXT(1)+W38EXT(2)
00087;                 DO 1 I=1,3
00088; 011D            WDEL(I)=DELTA(I)
00089;                 DO 1 J=1,5
00090; 012F          1 A(J,I)=0.0
00091;          C
00092;          C      BEGINNING OF MAJOR ITERATION LOOP
00093;          C
00094; 0145            A(1,1)=W38EXT(1)
00095;                 A(1,2)=COND(1)
00096;                 A(1,3)=COND(2)
00097;                 IF(.NOT.AM(2).OR..NOT.AM(4)) WDEL(1)=0.0
00098; 0159            IF(.NOT.AM(1).AND..NOT.AM(2)) WDEL(2)=0.0
00099; 0168            IF(.NOT.AM(3).AND..NOT.AM(4)) WDEL(3)=0.0
00100; 0178            TOT1=0.0
00101;                 DO 76 K=1,3
00102; 0180         76 TOT1=TOT1+WDEL(K)
00103; 0191            IF(TOT1.LE.0.0) GO TO 1000
00104; 0195   C
00105; 0196          2 IF(AN.GT.5.0) GO TO 1000
00106; 019D   C        WRITE(21,200) (A(1,J),J=1,4),REFCST
00107; 019E            PERCRT=0.0
00108;                 N=0
00109;          C
00110;          C      BEGINNING OF MINOR ITERATION LOOP
00111;          C
00112; 01A4         20 N=N+1
00113;                 IF(N.GT.10) GO TO 32
00114; 01AB            IF(A(1,2).GT.CONDMIN(1)) GO TO 4
00115; 01B3            DIFF=CONDMIN(1)-A(1,2)
00116;                 A(1,2)=CONDMIN(1)
00117;                 IF(WDEL(1).EQ.0.0) GO TO 4
00118; 01C6            A(1,1)=A(1,1)-DIFF
00119;                 IF(A(1,1).LT.0.0) A(1,1)=0.0
00120; 01D6          4 IF(A(1,3).GT.CONDMIN(2)) GO TO 5
00121; 01DE            A(1,3)=CONDMIN(2)
00122; 01F3          5 CONTINUE
00123;          C
00124;          C      APPLY CONSTRAINTS
00125;          C
00126;                 CALL CALCPWR(1,TOTEXT,A,WHP,THROTL,POWER,AM)
00127;          C      WRITE(21,200) THROTL,POWER
00128;          C
00129;                 DO 50 I=2,4
00130; 01ED            DO 50 J=1,3
00131; 01F0         50 A(I,J)=A(1,J)+WDEL(J)
00132;          C
00133; 0212            A(2,1)=A(1,1)+2.0*WDEL(1)
00134;                 A(3,2)=A(1,2)+3.0*WDEL(2)
00135;                 A(4,3)=A(1,3)+4.0*WDEL(3)
```

```
01361         C
01371               DO 6 I=2,3
01381  022C         A(2,I)=A(1,I)
01391               IF(I.LE.2) GO TO 6
01401  0248         A(3,I)=A(1,I)
01411               IF(I.LE.3) GO TO 6
01421  025E         A(4,I)=A(1,I)
01431  026E       6 CONTINUE
01441         C
01451         C     CALCULATE COST FOR EACH OF THE FIVE CASES
01461         C
01471  0272         DO 7 I=1,4
01481  0274         CALL CALCPWR(I,TOTEXT,A,WHP,THROTL,POWER,AM)
01491  027C       7 CONTINUE
01501         C
01511         C     DO 150 I=1,5
01521         C 150 WRITE(21,200) (A(I,J),J=1,3),RESP(I)
01531  0290     200 FORMAT(1H0,6F14.4)
01541         C
01551         C     ADJUST BASE CASE
01561         C
01571               AMIN=10000.
01581               DO 8 I=1,4
01591  0288         IF(RESP(I).LT.AMIN) GO TO 80
01601  0294         II=I
01611               AMIN=RESP(I)
01621  029F      80 IF(RESP(I).GT.REFCST) GO TO 8
01631  02A1         IJ=I
01641               REFCST=RESP(I)
01651  02BC       8 CONTINUE
01661  02C0         DO 82 I=1,4
01671  02C2      82 REF(I)=A(IJ,I)
01681  02D8         WRITE(21,200) REF,REFCST
01691  02E3      81 CONTINUE
01701         C
01711         C     WRITE(21,201) II,IJ
01721             201 FORMAT(1H ,4I4)
01731         C
01741               DO 9 J=1,4
01751  02E6         TOT(J)=0.0
01761               DO 10 I=1,4
01771  02F3         IF(I.EQ.II) GO TO 10
01781  02F9         TOT(J)=TOT(J)+A(I,J)
01791  0311      10 CONTINUE
01801  0315         TOT(J)=TOT(J)*2.0/3.0-A(II,J)
01811  0335       9 CONTINUE
01821         C     WRITE(21,200) TOT
01831  033A         IF(ABS(PERCHT-TOT(4)).GT.0.2) GO TO 22
01841  0346   C
01851         C     END OF THIS ITERATION
01861         C
01871  0347      32 AN=AN+1.0
01881               DO 23 I=1,3
01891  0350         IF(I.EQ.1) GO TO 24
01901  0356         J=I-1
01911               IF(A(1,I).LE.CONDMIN(J)) WDEL(I)=0.0
01921  0374      24 WDEL(I)=WDEL(I)/AN
01931  03A5      23 A(1,I)=REF(I)-WDEL(I)
01941         C     WRITE(21,202) REF,REFCST
01951  03A5     202 FORMAT(1H ,14HNEW ITERATION ,6F14.4)
01961               GO TO 2
01971         C
01981  0347      22 PERCRT=TOT(4)
01991               DO 11 I=1,3
02001  03AE         A(1,I)=TOT(I)-WDEL(I)
02011               IF(A(1,I).LT.0.0) A(1,I)=0.0
02021  03D8      11 CONTINUE
02031  03DC         GO TO 20
02041         C
02051  03DE    1000 TIETEMP=TOTPWR-POWER(1)-POWER(2)
02061               TEMPEXT=TOTEXT-REF(1)
02071               COND(1)=THROTL(1)-WHP(1)-REF(1)
02081               COND(2)=THROTL(2)-TEMPEXT
02091               WRITE(21,220)
02101  0401         WRITE(21,221) THROTL(1),WHP(1),REF(1),COND(1),POWER(1),REFCST
02111  0419         WRITE(21,221) THROTL(2),WHP(2),TEMPEXT,COND(2),POWER(2),TIETEMP
02121  042C         GO TO 1101
02131         C
```

```
02214: 042E   1100 CONTINUE
02215:     C           ****************************
02216:     C           *   DEMAND CONTROL SECTION  *
02217:     C           ****************************
02218:              IF(.NOT.FIRSTPUL) GO TO 103
02219: 0431   C
02220:       C  DEMAND CONTROL NOT EXERCISED DURING FIRST 4 MINUTES OF A PERIOD
02221:       C
02222: 0433      IF(TINPER.LT.TNOCSEC) GO TO 103
02223: 0439   C
02224: 043A      TREMPER=PERIOD-TINPER
02225:           DEMPROJ=4.0*(ENGPRCH+(TIELINE*(PERIOD-TINPER)/60.)/60.)
02226:           ESTERR=DEMPROJ-BUYLIM
02227:           IF(ESTERR.LT.0.0.AND.ESTERR.GT.-DEADBND) ESTERR=0.0
02228: 0469      IF(TINPER.LT.TNFINSC) GO TO 101
02229: 046F   C
02230:       C  ADJUSTABLE BIAS AND NO DEADBAND DURING LAST 5 MINUTES OF A DEMAND
02231:       C  PERIOD
02232:       C
02233: 0470      TEMP=(TREMPER*BIAS)/(PERIOD-TNFINSC)
02234:           IF(TEMP.LT.0.0) TEMP=0.0
02235: 0486      ESTERR=ESTERR+TEMP
02236:           GO TO 102
02237: 048F  101 ESTERR=ESTERR+BIAS
02238:           IF(ESTERR.GT.DEADBND) ESTERR=DEADBND
02239: 049E  102 CONTINUE
02240:           ALDCHNG=ESTERR
02241:           IF(ALDCHNG.GT.DELPMAX) ALDCHNG=DELPMAX
02242: 04AB      IF(ALDCHNG.LT.-DELPMAX) ALDCHNG=-DELPMAX
02243: 04B8      GCONDINC=GCONDINC+ALDCHNG
02244:           IF(GCONDINC.LT.0.0) GCONDINC=0.0
02245: 04C0   C
02246: 04C4  103 LL=1
02247:           IF(COEF(4,2).LT.COEF(4,1)) LL=2
02248: 04D0      IF(.NOT.AM(1)) LL=2
02249: 04D6      MM=3-LL
02250:           TCONDINC=GCONDINC
02251:           IF(TCONDINC.NE.0.0) GO TO 104
02252: 04EA      TEMCST=COEF(4,LL)*STMCST
02253:           IF(TEMCST.GT.PWRCST) GO TO 105
02254: 04F6   C ******** ADJUST "POWER(I)" TO MAXIMIZE GENERATED POWER
02255: 04F7      TCONDINC=TOTPWR-GTIEMIN-POWER(1)-POWER(2)
02256: 0503  104 CONTINUE
02257:           DIFF=PMAX(LL)-POWER(LL)
02258:           SDIFF=(WMAX(LL)-THROTL(LL))/COEF(4,LL)
02259:           QDIFF=AMIN1(DIFF,SDIFF,TCONDINC)
02260:           RDIFF=TCONDINC-QDIFF
02261:           IF(RDIFF.LT.0.0) RDIFF=0.0
02262: 0543      IF(MM.EQ.2.AND..NOT.AM(3)) RDIFF=0.0
02263: 0555      POWER(LL)=POWER(LL)+QDIFF
02264:           POWER(MM)=POWER(MM)+RDIFF
02265: 0578  105 CONTINUE
02266:     C  *****************************************************
02267:     C  *   TURBINE AND EXTRACTION VALVE CONTROL SECTION    *
02268:     C  *****************************************************
02269:           ACTARR(1)=GPTG5
02270:           ACTARR(2)=W38TG5
02271:           ACTARR(3)=GPTG6
02272:           ACTARR(4)=W38TG6
02273:     C
02274:           TARGARR(1)=POWER(1)
02275:           TARGARR(2)=W38EXT(1)
02276:           TARGARR(3)=POWER(2)
02277:           TARGARR(4)=W38EXT(2)
02278:     C
02279:           DO 120 I=1,4
02280: 0590      DELIN(I)=TARGARR(I)-ACTARR(I)
02281:           IF(.NOT.AM(I)) DELIN(I)=0.0
02282: 05C1      IF(DELIN(I).GT.DELMAX(I)) DELIN(I)=DELMAX(I)
02283: 05DF      IF(DELIN(I).LT.-DELMAX(I)) DELIN(I)=-DELMAX(I)
02284: 0605  120 CONTINUE
02285:     C
02286: 0609      CALL GAUSS(4,5,MATR,IFLAG)
02287:           IF(IFLAG.NE.0) GO TO 2000
02288: 0612      DO 121 I=1,4
02289: 0614      IARR(I)=IFIX(DELOUT(I)*ERRTM(I))
02290:           IF(IARR(I).GT.IMAX(I)) IARR(I)=IMAX(I)
02291: 063E      IF(IARR(I).LT.-IMAX(I)) IARR(I)=-IMAX(I)
02292: 0656  121 CONTINUE
```

```
02931         C
02941  065A         IF(P3AHDR.LE.P3ALMX) GO TO 123
02951  0649         IF(AM(2).AND.AM(4)) GO TO 122
02961  066E         IF(AM(2)) IARR(2)=-IMAX(2)
02971  067A         IF(AM(4)) IARR(4)=-IMAX(4)
02981  067A         GO TO 123
02991  067C     122 IARR(2)=-3
03001               IARR(4)=-2
03011  06A1     123 CONTINUE
03021         C
03031               IF(P3BHDR.GE.P3BLMN) GO TO 126
03041  06A7  C ****** INCREASE EXTRACTION FLOW; BUT FIRST
03051         C ****** CHECK WHETHER EXTRACTION VALVE WIDE OPEN
03061  06B8         IF(EX5ULMT) GO TO 130
03071  06AC         IARR(2)=IMAX(2)
03081               GO TO 131
03091  06B0     130 IF(EX6ULMT) GO TO 131
03101  0694         IARR(4)=IMAX(4)
03111  0696     131 CONTINUE
03121         C
03131         C   TRY TO INCREASE GENERATED POWER SO AS TO MAKE MORE STEAM AVAILABLE
03141         C   TO EXTRACTION
03151         C
03161               IF(GPTG5.GT.PLXTMX5) GO TO 125
03171  069E         IF(AM(1)) IARR(1)=1
03181  06A2     125 CONTINUE
03191               IF(GPTG6.GT.PLXTMX6) GO TO 126
03201  06AA         IF(AM(3)) IARR(3)=1
03211  06AE     126 CONTINUE
03221         C
03231         C   LOWER THE GENERATED POWER IF UTILITY TIE LINE OPERATING BELOW
03241         C   ASSIGNED LOW LIMIT
03251         C
03261               IF(GPTIELN.GT.GTIEMIN) GO TO 127
03271  06B6         IF(IARR(1).LT.0) GO TO 128
03281  06BA         IARR(1)=-1
03291  06BC     128 IF(IARR(3).GE.0) IARR(3)=IARR(3)-1
03301  06C1     127 CONTINUE
03311         C
03321         C   THE FOLLOWING CALL IS ONLY INCLUDED TO COMPLETE THE CONCEPTUAL
03331         C   DESIGN.  IT WILL NEED TO BE HANDLED DIFFERENTLY IN A MICRO-
03341         C   PROCESSOR CONTEXT.  CALL THIS SUBROUTINE EVERY 0.1 SECS
03351         C
03361               CALL CCOCON(IARR,ICNT)
03371         C
03381  06C4    2000 CALL EXIT
03391  06C5     220 FORMAT(1H0,3X,8HTHROTTLE,5X,9H HP EXTR.,5X,9H LP EXTR.,5X,
03401              1 10H CONDENSER,5X,5HPOWER)
03411           221 FORMAT(1H0,6F14.4)
03421               END

PGM SIZE: 1741  POOL SIZE: 0479  ERRORS: 0000  VERSION: 12  BINARY RECS: 0068

00011  0000        BLOCK DATA
00021         C
00031               REAL COEF(4,2),WMAX(2),PMAX(2),PMIN(2),CONDMIN(2)
00041         C
00051               COMMON/TURBCOM/COEF,WMAX,PMAX,PMIN,CONDMIN,W3BMIN(2),W3BMAX(2)
00061               COMMON/COSTCOM/TOTPWR,STMCST,PWRCST,TIEMIN
00071         C
00081               DATA CONDMIN/10000.,10000./
00091               DATA COEF/12000.,0.75,0.5,8.0,12400.,0.,0.5,8.57/
00101               DATA WMAX/240000.,135000./,PMAX/9500.,9500./,PMIN/4000.,3000./
00111               DATA W3BMAX/150000.,130000./
00121               DATA STMCST,PWRCST/.006727,.0700/,TIEMIN/2000./
00131               END

PGM SIZE: 0000  POOL SIZE: 0000  ERRORS: 0000  VERSION: 12  BINARY RECS: 0005

00011  0000        SUBROUTINE CALCPWR(I,TOTEXT,A,WHP,THROTL,POWER,AM)
00021         C
00031               REAL A(5,5),WHP(2),THROTL(2),POWER(2),COEF(4,2),RESP(4)
00041               REAL WMAX(2),PMAX(2),PMIN(2),CONDMIN(2),W3BMIN(2),W3BMAX(2)
00051               LOGICAL AM(6)
00061               COMMON/COSTCOM/TOTPWR,STMCST,PWRCST,TIEMIN
00071               COMMON/TURBCOM/COEF,WMAX,PMAX,PMIN,CONDMIN,W3BMIN,W3BMAX
```

```
0008:         C
0009:              TEMPEXT=TOTEXT-A(I,1)
0010: 0005   5    THROTL(1)=WHP(1)+A(I,1)+A(I,2)
0011:              THROTL(2)=WHP(2)+TEMPEXT+A(I,3)
0012:              IF(AM(1)) GO TO 10
0013: 0051         THROTL(1)=COEF(1,1)+COEF(2,1)*WHP(1)+COEF(3,1)*A(I,1)
0014:             1 +COEF(4,1)*POWER(1)
0015: 0080   10   IF(AM(3)) GO TO 11
0016: 0086        THROTL(2)=COEF(1,2)+COEF(2,2)*WHP(2)+COEF(3,2)*TEMPEXT
0017:             1 +COEF(4,2)*POWER(2)
0018: 00AE   11   POWER(1)=(THROTL(1)-COEF(1,1)-COEF(2,1)*WHP(1)-COEF(3,1)*A(I,1))
0019:             1 /COEF(4,1)
0020:              POWER(2)=(THROTL(2)-COEF(1,2)-COEF(2,2)*WHP(2)-COEF(3,2)*TEMPEXT)
0021:             1 /COEF(4,2)
0022:              DO 1 J=1,2
0023: 0109         GO TO (21,22),J
0024: 010E   21   TEMPEXT=A(I,1)
0025:              IF(AM(1)) GO TO 23
0026: 0120         GO TO 24
0027: 0121   22   TEMPEXT=TOTEXT-A(I,1)
0028:              IF(AM(3)) GO TO 23
0029: 0135         GO TO 24
0030: 0136   23   IF(POWER(J).LT.PMIN(J)) POWER(J)=PMIN(J)
0031: 0155   24   IF(POWER(J).LT.PMAX(J).AND.POWER(J).GT.PMIN(J)) GO TO 1
0032: 0181        IF(POWER(J).GT.PMAX(J)) POWER(J)=PMAX(J)
0033: 01A1        IF(J.EQ.1) TEMPEXT=A(I,1)
0034: 01B1        IF(J.EQ.2) TEMPEXT=TOTEXT-A(I,1)
0035: 01C3        THROTL(J)=COEF(1,J)+COEF(2,J)*WHP(J)+COEF(3,J)*TEMPEXT
0036:             1 + COEF(4,J)*POWER(J)
0037:              IF(POWER(J).EQ.0.0) THROTL(J)=0.0
0038: 0211   1    CONTINUE
0039:         C
0040: 0217        TIETEMP=TOTPWR-POWER(1)-POWER(2)
0041:              IF(TIETEMP.LT.TIEMIN) TIETEMP=TIEMIN
0042: 0235        IF(THROTL(1).GT.WMAX(1)) THROTL(1)=2.*THROTL(1)-WMAX(1)
0043: 0253        IF(THROTL(2).GT.WMAX(2)) THROTL(2)=2.*THROTL(2)-WMAX(2)

0044: 0271        RESP(I)=STMCST*(THROTL(1)+THROTL(2))+PWRCST*TIETEMP
0045:              A(I,4)=RESP(I)
0046:              RETURN
0047: 02A5        END

PGM SIZE: 0684  POOL SIZE:  0069  ERRORS: 0000  VERSION:  12  BINARY RECS:  0022

0001: 0000        SUBROUTINE GAUSS(N,N1,Q2,IFLAG)

0002:              REAL Q2(N,N1)
0003:              DATA REF/1.0E-10/
0004:         C
0005:         C    GAUSS-JORDAN REDUCTION FOR A SET OF N SIMULTANEOUS EQUATIONS
0006:         C
0007:         C    THIS SUBROUTINE FINDS THE SOLUTION VECTOR CORRESPONDING TO A
0008:         C    SET OF N SIMULTANEOUS LINEAR EQUATIONS USING THE GAUSS-
0009:         C    JORDAN REDUCTION ALGORITHM WITH THE DIAGONAL PIVOT STRATEGY.
0010:         C    THE SUBROUTINE BEGINS BY FIRST COPYING THE SOURCE MATRIX Q1
0011:         C    INTO THE WORKING MATRIX Q2.  REFERRING NOW TO MATRIX Q2,
0012:         C    THE N BY N1 MATRIX OF COEFFICIENTS APPEARS IN THE FIRST N
0013:         C    COLUMNS OF MATRIX 'Q2(N,N1)', THE N1-TH COLUMN CONTAINING
0014:         C    THE RIGHT-HAND VECTOR.  ON THE K-TH PASS OF THE ELIMINATION
0015:         C    SCHEME, K-TH ROW ELEMENTS ARE NORMALIZED BY DIVIDING BY THE
0016:         C    PIVOT ELEMENT Q2(K,K).  'DETER', THE DETERMINANT  OF THE
0017:         C    COEFFICIENT MATRIX, IS UPDATED PRIOR TO ELIMINATION OF ALL
0018:         C    NON-ZERO ELEMENTS (EXCEPT FOR THE PIVOT ELEMENT) IN THE K-TH
0019:         C    COLUMN.  SHOULD A PIVOT ELEMENT BE ENCOUNTERED WHICH IS SMALLER
0020:         C    IN MAGNITUDE THAN 'REF', COMPUTATION IS DISCONTINUED AND 'IFLAG'
0021:         C    IS MADE EQUAL TO UNITY, SO PERMITTING AN APPROPRIATE COMMENT
0022:         C    TO BE PRINTED BY THE CALLING PROGRAM.  OTHERWISE 'IFLAG' IS
0023:         C    RETURNED WITH ITS VALUE ZERO.
0024:         C
0025:         C    REFERENCE: "APPLIED NUMERICAL METHODS" BY CARNAHAN, LUTHER
0026:         C    AND WILKES, JOHN WILEY & SONS INC. (1969)
0027:         C
0028:              DETER=1.0
0029: 0005   C
0030:         C    SOLUTION BY GAUSS-JORDAN ELIMINATION
0031:         C
0032:              DO 9 K=1,N
0033: 0009   C
```

```
0034:      C       UPDATE THE DETERMINANT VALUE
0035:      C
0036: 000B         DETER=DETER*Q2(K,K)
0037:      C
0038:      C       CHECK FOR PIVOT ELEMENT BEING TOO SMALL
0039:      C
0040:              IF(ABS(Q2(K,K)).GT.REF) GO TO 5
0041: 0029         IFLAG=1
0042:              GO TO 100
0043: 0028  C
0044:      C       NORMALIZE THE PIVOT ROW
0045:      C
0046: 002C       5 CONTINUE
0047:              KP1=K+1
0048:              DO 6 J=KP1,N1
0049: 0031       6 Q2(K,J)=Q2(K,J)/Q2(K,K)
0050: 0052         Q2(K,K)=1.0
0051:      C
0052:      C       ELIMINATE KTH.COLUMN ELEMENTS EXCEPT FOR PIVOT
0053:      C
0054:              DO 9 I=1,N
0055: 0062         IF(I.EQ.K.OR.Q2(I,K).EQ.0.0) GO TO 9
0056: 0080         DO 8 J=KP1,N1
0057: 0082       8 Q2(I,J)=Q2(I,J)-Q2(I,K)*Q2(K,J)
0058: 0080         Q2(I,K)=0.0
0059: 00BE       9 CONTINUE
0060: 00C8         IFLAG=0
0061: 00C9     100 RETURN
0062: 00CB         END

PGM SIZE: 0209  POOL SIZE:  0030  ERRORS: 0000  VERSION: 12  BINARY RECS:  0006

0001: 0000         SUBROUTINE CCOCON(IARR,ICNT)
0002:      C
0003:              INTEGER IARR(4)
0004:              BIT CCO
0005:      C
0006:      C       THE INTENT HERE IS TO SET UP THE DESIRED BIT PATTERN IN REGISTER
0007:      C       "CCO" AND THEN TO MAKE JUST ONE I/O CALL TO THE "QRO" CARD
0008:      C
0009:              ICNT=0
0010: 0005         DO 40 I=1,4
0011: 0008         J=I+4
0012:              IF(IARR(I)) 41,42,43
0013: 0010  C
0014:      C       LOWER SETTING BY DRIVING DEVICE DOWN
0015:      C
0016: 0012      41 IARR(I)=IARR(I)+1
0017:              CCO(I)=.TRUE.
0018:              CCO(J)=.FALSE.
0019:              ICNT=ICNT+1
0020:              GO TO 40
0021: 002E  C
0022:      C       RAISE SETTING BY DRIVING DEVICE UP
0023:      C
0024: 002F      43 IARR(I)=IARR(I)-1
0025:              CCO(I)=.FALSE.
0026:              CCO(J)=.TRUE.
0027:              ICNT=ICNT+1
0028:              GO TO 40
0029: 004B  C
0030:      C       MOVEMENT OF DEVICE TO STOP
0031:      C
0032: 004C      42 CCO(I)=.FALSE.
0033:              CCO(J)=.FALSE.
0034:      C
0035: 005C      40 CONTINUE
0036: 0060         RETURN
0037: 0062         END

PGM SIZE: 0105  POOL SIZE:  0018  ERRORS: 0000  VERSION: 12  BINARY RECS:  0004

B//ASSIGN BT=12
          B//REWIND BT
          B//LINK
           12:54:13
           LINK LOADER VERSION X7
```

```
XM
 ORIGIN= 9EA0
LD,LD,LD,LD,LD
 AREA USED 9EA0--A77B
 SYMBOL= CALCPWR
 AREA USED A77C--AA6C
 SYMBOL= GAUSS
 AREA USED AA6D--AB5B
 SYMBOL= CCOCON
 AREA USED AB5C--ABD6
LB,F
 SYMBOL= IFIX
 AREA USED ABD7--ABEC
 SYMBOL= AMIN1
 SYMBOL= MIN1
 AREA USED ABED--AC23
 SYMBOL= ARS
 AREA USED AC24--AC2F
 SYMBOL= GOTI
 AREA USED AC30--AC47
 SYMBOL= SBTI
 SYMBOL= SATI
 AREA USED AC4B--AC62
 SYMBOL= TSAI
 AREA USED AC63--AC6D
 SYMBOL= REIT
 SYMBOL= RIBI
 AREA USED AC6F--AC7B
 SYMBOL= RERI
 SYMBOL= RRRI
 AREA USED AC7C--AC89
UN
 NONE
MP
 IFIX    = ABDF  CALCPWR = A77E  ARS    = AC24  AMIN1 = ABFA
 GAUSS   = AA6F  CCOCON  = AB5E  SATI   = AC49  GOTI  = AC30
 TSAI    = AC63  RIBI    = AC6F  MIN1   = ABFC  RRRI  = AC7D
 SBTI    = AC4A  REIT    = AC6E  RERI   = AC7C
 TURBCOM = 9EA0--9EC7  COSTCOM = 9ECA--9ECF
 ::::::ORG= 9EA0
XE
```

|   |   |   |   |   |   |
|---|---|---|---|---|---|
| 7016.0000 | 10000.0000 | 20314.4375 | 1745.9912 | 1745.9912 |   |
| 7016.0000 | 10000.0000 | 15314.4375 | 1737.7354 | 1737.7354 |   |
| 5016.0000 | 10000.0000 | 10314.4375 | 1729.8413 | 1729.8413 |   |
| 5016.0000 | 10000.0000 | 10000.0000 | 1729.6157 | 1729.6157 |   |
| 5016.0000 | 10000.0000 | 10000.0000 | 1729.6157 | 1729.6157 |   |
| 4516.0000 | 10000.0000 | 10000.0000 | 1729.4124 | 1729.4124 |   |
| 4642.6460 | 10000.0000 | 10000.0000 | 1729.4011 | 1729.4011 |   |
| 4682.6650 | 10000.0000 | 10000.0000 | 1729.4011 | 1729.4011 |   |
| 4404.8857 | 10000.0000 | 10000.0000 | 1729.4324 | 1729.4011 |   |
| 4404.8848 | 10000.0000 | 10000.0000 | 1729.4324 | 1729.4011 |   |
| 4474.3271 | 10000.0000 | 10000.0000 | 1729.4197 | 1729.4011 |   |
| 4474.3262 | 10000.0000 | 10000.0000 | 1729.4197 | 1729.4011 |   |
| 4488.2129 | 10000.0000 | 10000.0000 | 1729.4175 | 1729.4011 |   |
| THROTTLE | HP EXTR. | LP EXTR. | CONDENSER | POWER |   |
| 152888.1875 | 135400.0000 | 4488.2129 | 9999.9746 | 4355.5098 | 1729.4011 |
| 66391.7812 | 0.0000 | 56391.7812 | 10000.0000 | 3010.0220 | 5846.0678 |
| 5900.0000 | 10000.0000 | 17814.4375 | 1742.2278 | 1742.2278 |   |
| 5000.0000 | 10000.0000 | 12814.4375 | 1733.9719 | 1733.9719 |   |
| 5000.0000 | 10000.0000 | 10000.0000 | 1729.6055 | 1729.6055 |   |

| | | | | |
|---|---|---|---|---|
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |
| 5000.0000 | 10000.0000 | 10000.0000 | 1729.6055 | 1729.6055 |

| THROTTLE | HP EXTR. | LP EXTR. | CONDENSER | POWER | |
|---|---|---|---|---|---|
| 153400.0000 | 138400.0000 | 5000.0000 | 10000.0000 | 4387.5000 | 1729.6055 |
| 66049.9844 | 0.0000 | 55880.0000 | 10169.9844 | 3000.0000 | 5824.5000 |

| | | | | |
|---|---|---|---|---|
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |
| 5000.0000 | 14900.0000 | 10000.0000 | 1735.9241 | 1735.9241 |

| THROTTLE | HP EXTR. | LP EXTR. | CONDENSER | POWER | |
|---|---|---|---|---|---|
| 158300.0000 | 138400.0000 | 5000.0000 | 14900.0000 | 5000.0000 | 1735.9241 |
| 66049.9844 | 0.0000 | 55880.0000 | 10169.9844 | 3000.0000 | 5212.0000 |

| | | | | |
|---|---|---|---|---|
| 30880.0000 | 10000.0000 | 30754.4375 | 1758.9138 | 1758.9138 |
| 30880.0000 | 10000.0000 | 25754.4375 | 1750.6580 | 1750.6580 |
| 30880.0000 | 10000.0000 | 20754.4375 | 1746.2915 | 1746.2915 |
| 30880.0000 | 10000.0000 | 15754.4375 | 1746.2915 | 1746.2915 |
| 30880.0000 | 10000.0000 | 17421.1016 | 1746.2915 | 1746.2915 |
| 30880.0000 | 10000.0000 | 18921.1016 | 1746.2915 | 1746.2915 |
| 30880.0000 | 10000.0000 | 16421.1016 | 1746.2915 | 1746.2915 |
| 30880.0000 | 10000.0000 | 16921.0977 | 1746.2915 | 1746.2915 |
| 30880.0000 | 10000.0000 | 16087.7637 | 1746.2915 | 1746.2915 |
| 30880.0000 | 10000.0000 | 16212.7617 | 1746.2915 | 1746.2915 |
| 30880.0000 | 10000.0000 | 16004.4238 | 1746.2915 | 1746.2915 |
| 30880.0000 | 10000.0000 | 16029.4219 | 1746.2915 | 1746.2915 |
| 30880.0000 | 10000.0000 | 16007.7520 | 1746.2915 | 1746.2915 |

| THROTTLE | HP EXTR. | LP EXTR. | CONDENSER | POWER | |
|---|---|---|---|---|---|
| 179280.0000 | 138400.0000 | 16000.1000 | 10000.0000 | 6005.0000 | 1746.2915 |

| | | | | | |
|---|---|---|---|---|---|
| 53109.9922 | 0.0000 | 30000.0000 | 23109.9922 | 3000.0000 | 4207.0000 |
| 30880.0000 | 10000.0000 | 31679.9922 | 1760.4419 | 1760.4419 | |
| 30880.0000 | 10000.0000 | 31679.9844 | 1760.4419 | 1760.4419 | |
| 30880.0000 | 10000.0000 | 31679.9844 | 1760.4419 | 1760.4419 | |
| 30880.0000 | 10000.0000 | 31679.9844 | 1760.4419 | 1760.4419 | |
| 30880.0000 | 10000.0000 | 31679.9844 | 1760.4417 | 1760.4417 | |
| 30880.0000 | 10000.0000 | 31679.9844 | 1760.4417 | 1760.4417 | |
| 30880.0000 | 10000.0000 | 31679.9844 | 1760.4414 | 1760.4414 | |
| 30880.0000 | 10000.0000 | 31679.9844 | 1760.4414 | 1760.4414 | |
| 30880.0000 | 10000.0000 | 31679.9844 | 1760.4414 | 1760.4414 | |
| 30880.0000 | 10000.0000 | 31679.9844 | 1760.4414 | 1760.4414 | |
| THROTTLE | HP EXTR. | LP EXTR. | CONDENSER | POWER | |
| 179250.0000 | 133400.0000 | 30880.0000 | 10000.0000 | 6005.0000 | 1760.4414 |
| 61679.6094 | 0.0000 | 30000.0000 | 31679.6094 | 3909.9541 | 3207.0459 |
| 30000.0000 | 10000.0000 | 30314.4375 | 1758.3467 | 1758.3467 | |
| 30000.0000 | 10000.0000 | 25314.4375 | 1750.0908 | 1750.0908 | |
| 30000.0000 | 10000.0000 | 20314.4375 | 1745.7241 | 1745.7241 | |
| 30000.0000 | 10000.0000 | 15314.4375 | 1745.7241 | 1745.7241 | |
| 30000.0000 | 10000.0000 | 16981.1016 | 1745.7241 | 1745.7241 | |
| 30000.0000 | 10000.0000 | 18481.1016 | 1745.7241 | 1745.7241 | |
| 30000.0000 | 10000.0000 | 15981.1016 | 1745.7241 | 1745.7241 | |
| 30000.0000 | 10000.0000 | 16081.0977 | 1745.7241 | 1745.7241 | |
| 30000.0000 | 10000.0000 | 15647.7637 | 1745.7241 | 1745.7241 | |
| 30000.0000 | 10000.0000 | 15772.7617 | 1745.7241 | 1745.7241 | |
| 30000.0000 | 10000.0000 | 15564.4238 | 1745.7241 | 1745.7241 | |
| 30000.0000 | 10000.0000 | 15549.4219 | 1745.7241 | 1745.7241 | |
| 30000.0000 | 10000.0000 | 15547.7520 | 1745.7241 | 1745.7241 | |
| THROTTLE | HP EXTR. | LP EXTR. | CONDENSER | POWER | |
| 178400.0000 | 136400.0000 | 30000.0000 | 10000.0000 | 5950.0000 | 1745.7241 |
| 53549.9922 | 0.0000 | 30880.0000 | 22669.9922 | 3000.0000 | 4262.0000 |

We claim:

1. In a cogeneration system including at least a first and a second turbogenerator unit, each supplied through throttle valve means with steam at a higher throttle pressure, for generating steam through extraction valve means at a lower extraction pressure and for exhausting steam to an associated condenser at a still lower exhaust pressure and under condenser constraints, while generating electrical power at an operating speed of the associated turbogenerator unit, said generated steam and electrical power being supplied to a plant together with electrical power derived from a tie-line, each of said turbogenerator units having a throttle flow input and a condenser flow output, at least one of said turbogenerator units having an extraction flow output, while generating output electrical power; the combination of:

first means responsive to a present steam demand of the plant for determining under said condenser constraints an optimal steam flow output distribution between said exhaustion flow and condenser flow outputs from said turbogenerator units;

second means responsive to said optimal steam output distribution and to said plant power demand for providing a throttle flow input distribution for said turbogenerator units; and control means responsive to said first and second means and operative on said extraction valve means and said throttle valve means for establishing said optimal steam flow output and throttle steam flow input distributions;

whereby said steam and power demands of the plant are optimally satisfied.

2. The system of claim 1 with the operation of said first means involving a mathematical model combining the total steam inputted to each unit, the total of the steam extracted from each unit, the condenser exhaust of each unit and the power outputted by each unit in terms of the steam energy consumed therefor and said mathematical model involving EVOP by equating throttle steam flow to extraction flow from condenser, with the outputted cogenerated power being accounted for in terms of throttle steam flow, lower pressure steam flow and condenser flow.

3. The system of claim 2 with demand control means being associated with the tie-line power consumption, said demand control means being responsive to an assigned power demand limit for establishing a deviation from said demand limit as one of a want and excess power, said second means being concurrently responsive to said steam demand, power demand, throttle flow, extraction flow, exhaust flow, and power deviation for increasing tie-line power when cogenerated power has already been maximized and for decreasing cogenerated power by increasing exhaust flow when said power deviation exceeds the demand limit.

* * * * *